United States Patent
Saggar et al.

(10) Patent No.: US 12,348,347 B2
(45) Date of Patent: Jul. 1, 2025

(54) EXTRA GUARD INTERVAL

(71) Applicant: QUALCOMM Incorporated, San Diego, CA (US)

(72) Inventors: Hemant Saggar, San Diego, CA (US); Iyab Issam Sakhnini, San Diego, CA (US); Jing Sun, San Diego, CA (US); Xiaoxia Zhang, San Diego, CA (US); Tao Luo, San Diego, CA (US); Junyi Li, Fairless Hills, PA (US); Morteza Soltani, San Diego, CA (US); Raviteja Patchava, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 45 days.

(21) Appl. No.: 18/316,937

(22) Filed: May 12, 2023

(65) Prior Publication Data

US 2024/0380645 A1 Nov. 14, 2024

(51) Int. Cl.
*H04L 27/26* (2006.01)
*H04L 1/00* (2006.01)
*H04L 25/03* (2006.01)

(52) U.S. Cl.
CPC ........ *H04L 27/2605* (2013.01); *H04L 1/0003* (2013.01); *H04L 25/03343* (2013.01)

(58) Field of Classification Search
CPC ........... H04L 27/2605; H04L 25/03343; H04L 27/2607; H04L 1/003
See application file for complete search history.

(56) References Cited

U.S. PATENT DOCUMENTS

| | | | |
|---|---|---|---|
| 2019/0158331 A1 | 5/2019 | Pawar et al. | |
| 2019/0223175 A1* | 7/2019 | Hakola | H04L 27/2605 |
| 2020/0287679 A1 | 9/2020 | Sun et al. | |
| 2022/0182993 A1 | 6/2022 | Zhang et al. | |
| 2023/0051510 A1 | 2/2023 | Zhang et al. | |
| 2023/0117317 A1 | 4/2023 | Sakhnini et al. | |
| 2023/0135780 A1 | 5/2023 | Sakhnini et al. | |
| 2023/0140287 A1 | 5/2023 | Sakhnini et al. | |

OTHER PUBLICATIONS

International Search Report and Written Opinion—PCT/US2024/017834—ISA/EPO—Jun. 14, 2024.

* cited by examiner

*Primary Examiner* — Rahel Guarino
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may receive a configuration that indicates, within each symbol of a plurality of symbols, an extra guard interval (GI) before data and a tail GI after the data. The UE may decode first data within a first symbol of the plurality of symbols at a first time location that is based at least in part on the extra GI and the tail GI within the first symbol. The UE may decode second data within a second symbol of the plurality of symbols at a second time location that is based at least in part on the tail GI within the second symbol. Numerous other aspects are described.

30 Claims, 23 Drawing Sheets

EXTRA GUARD INTERVAL

FIELD OF THE DISCLOSURE

Aspects of the present disclosure generally relate to wireless communication and to techniques and apparatuses for using an extra guard interval for communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration that indicates, within each symbol of a plurality of symbols, an extra guard interval (GI) before data and a tail GI after the data. The method may include decoding first data within a first symbol of the plurality of symbols at a first time location that is based at least in part on the extra GI and the tail GI within the first symbol. The method may include decoding second data within a second symbol of the plurality of symbols at a second time location that is based at least in part on the tail GI within the second symbol.

Some aspects described herein relate to a method of wireless communication performed by a UE. The method may include receiving a configuration that indicates, within each symbol of a plurality of symbols, an extra GI before data and a tail GI after the data. The method may include transmitting first data within a first symbol of the plurality of symbols at a first time location that is based at least in part on the extra GI and the tail GI within the first symbol. The method may include transmitting second data within a second symbol of the plurality of symbols at a second time location that is based at least in part on the extra GI and the tail GI placed within the second symbol.

Some aspects described herein relate to a method of wireless communication performed by a network entity. The method may include generating a configuration that indicates, within each symbol of a plurality of symbols, an extra GI before data and a tail GI after the data. The method may include transmitting the configuration.

Some aspects described herein relate to a UE for wireless communication. The UE may include one or more memories and one or more processors coupled to the one or more memories. The one or more processors may be configured to receive a configuration that indicates, within each symbol of a plurality of symbols, an extra GI before data and a tail GI after the data. The one or more processors may be configured to decode first data within a first symbol of the plurality of symbols at a first time location that is based at least in part on the extra GI and the tail GI within the first symbol. The one or more processors may be configured to decode second data within a second symbol of the plurality of symbols at a second time location that is based at least in part on the tail GI within the second symbol.

Some aspects described herein relate to a UE for wireless communication. The UE may include one or more memories and one or more processors coupled to the one or more memories. The one or more processors may be configured to receive a configuration that indicates, within each symbol of a plurality of symbols, an extra GI before data and a tail GI after the data. The one or more processors may be configured to transmit first data within a first symbol of the plurality of symbols at a first time location that is based at least in part on the extra GI and the tail GI within the first symbol. The one or more processors may be configured to transmit second data within a second symbol of the plurality of symbols at a second time location that is based at least in part on the extra GI and the tail GI placed within the second symbol.

Some aspects described herein relate to a network entity for wireless communication. The network entity may include one or more memories and one or more processors coupled to the one or more memories. The one or more processors may be configured to generate a configuration that indicates, within each symbol of a plurality of symbols, an extra GI before data and a tail GI after the data. The one or more processors may be configured to transmit the configuration.

Some aspects described herein relate to a non-transitory computer-readable medium that stores a set of instructions for wireless communication by a UE. The set of instructions, when executed by one or more processors of the UE, may cause the UE to receive a configuration that indicates, within each symbol of a plurality of symbols, an extra GI before data and a tail GI after the data. The set of instructions, when executed by one or more processors of the UE, may cause the UE to decode first data within a first symbol of the plurality of symbols at a first time location that is based at least in part on the extra GI and the tail GI within the first symbol. The set of instructions, when executed by one or more processors of the UE, may cause the UE to decode second data within a second symbol of the plurality of symbols at a second time location that is based at least in part on the tail GI within the second symbol.

Some aspects described herein relate to a non-transitory computer-readable medium that stores a set of instructions for wireless communication by a UE. The set of instructions, when executed by one or more processors of the UE, may cause the UE to receive a configuration that indicates, within each symbol of a plurality of symbols, an extra GI before data and a tail GI after the data. The set of instructions, when executed by one or more processors of the UE, may cause the UE to transmit first data within a first symbol of the plurality of symbols at a first time location that is based at least in part on the extra GI and the tail GI within the first symbol. The set of instructions, when executed by one or more processors of the UE, may cause the UE to transmit second data within a second symbol of the plurality of symbols at a second time location that is based at least in part on the extra GI and the tail GI placed within the second symbol.

Some aspects described herein relate to a non-transitory computer-readable medium that stores a set of instructions for wireless communication by a network entity. The set of instructions, when executed by one or more processors of the network entity, may cause the network entity to generate a configuration that indicates, within each symbol of a plurality of symbols, an extra GI before data and a tail GI after the data. The set of instructions, when executed by one or more processors of the network entity, may cause the network entity to transmit the configuration.

Some aspects described herein relate to an apparatus for wireless communication. The apparatus may include means for receiving a configuration that indicates, within each symbol of a plurality of symbols, an extra GI before data and a tail GI after the data. The apparatus may include means for decoding first data within a first symbol of the plurality of symbols at a first time location that is based at least in part on the extra GI and the tail GI within the first symbol. The apparatus may include means for decoding second data within a second symbol of the plurality of symbols at a second time location that is based at least in part on the tail GI within the second symbol.

Some aspects described herein relate to an apparatus for wireless communication. The apparatus may include means for receiving a configuration that indicates, within each symbol of a plurality of symbols, an extra GI before data and a tail GI after the data. The apparatus may include means for transmitting first data within a first symbol of the plurality of symbols at a first time location that is based at least in part on the extra GI and the tail GI within the first symbol. The apparatus may include means for transmitting second data within a second symbol of the plurality of symbols at a second time location that is based at least in part on the extra GI and the tail GI placed within the second symbol.

Some aspects described herein relate to an apparatus for wireless communication. The apparatus may include means for generating a configuration that indicates, within each symbol of a plurality of symbols, an extra GI before data and a tail GI after the data. The apparatus may include means for transmitting the configuration.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
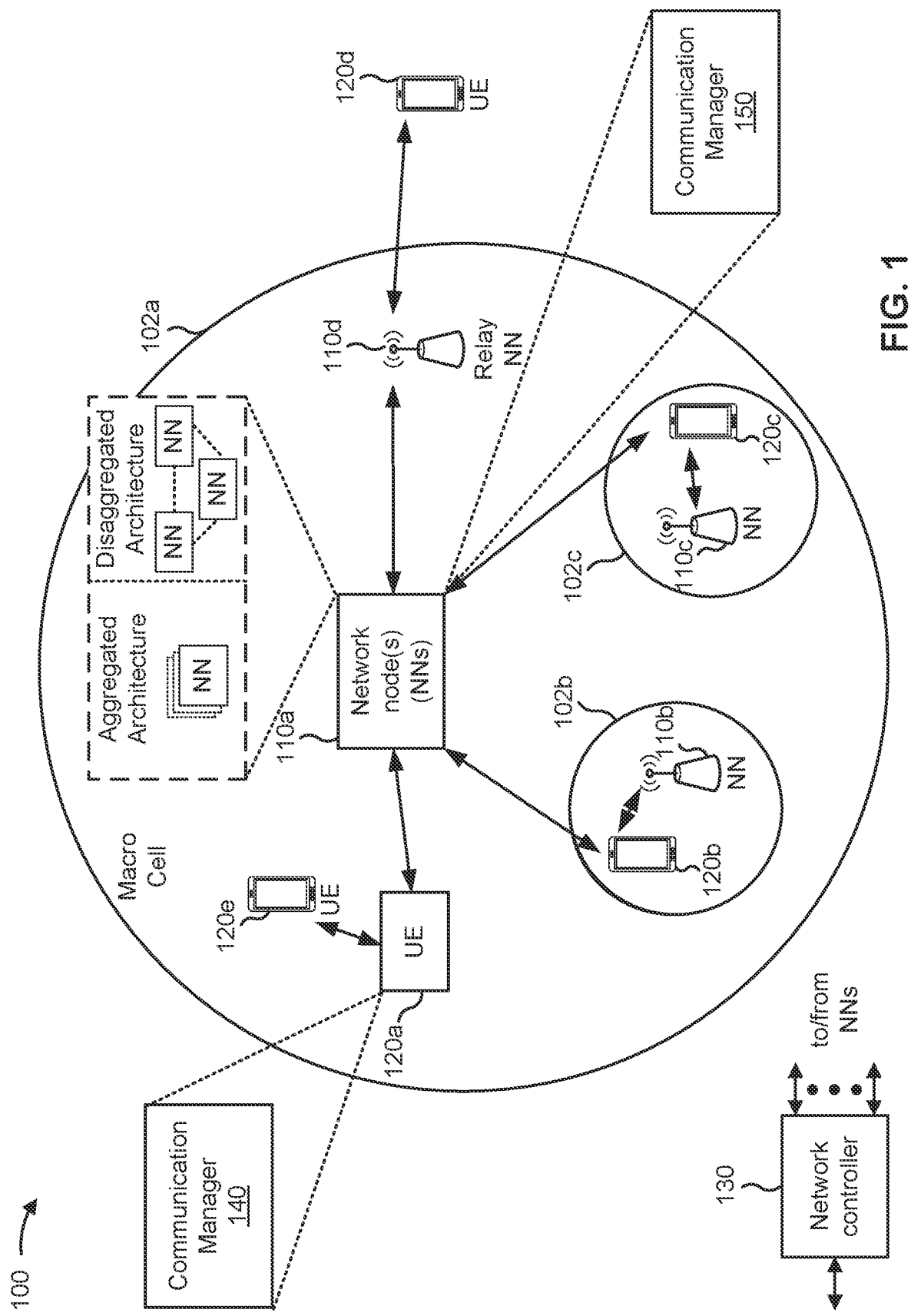
FIG. 1 is a diagram illustrating an example of a wireless network, in accordance with the present disclosure.

A transmitter may use a guard interval (GI) next to data to mitigate any neighboring interference, such as inter-symbol interference (ISI) from an adjacent symbol. The GI may include zeroes, a specific sequence (e.g., Zadoff-Chu sequence), or a copy of a portion of a reference signal. One property of a GI waveform is that a GI uses a previous symbol's GI to enable circular convolution. However, the prior symbol GI may not available or may be different at specific points in time. There may also be various scenarios where a GI or a beam may switch, causing GI samples to be different. If GIs are not properly used for communications, ISI may cause signal degradation, which wastes signaling resources.

According to various aspects described herein, a network entity may transmit a configuration that indicates, within each symbol of a plurality of symbols, an extra GI before data and a tail GI after the data. The extra GI may be part of a self-contained structure that mitigates the GI issues with switching. The extra GI may be a dedicated GI that is in addition to a tail GI within a symbol. A transmitter, such as a network entity, may transmit data within the symbol with the extra GI before the data and the tail GI after the data. A receiver, such as a user equipment (UE), may receive the data at a time location that is based at least in part on the extra GI and the tail GI. The UE may decode the data within a fast Fourier transform (FFT) window. The UE may shift the FFT window based at least in part on the extra GI, in order to include the data. The extra GI may be a GI, before a data portion within a symbol, that shifts the data portion later in time in the symbol, to better fit within an FFT window of a receiver. The shifting of the data portion later in time helps the data portion to remain within the FFT window even if there are delays in the data portion to longer propagation delays or a multipath delay spread.

By using the extra GI, the network entity and the UE may help to ensure the decoding of the data while accounting for variations in timing of when the data is received. As a result, communications are not degraded, signaling resources are conserved (not otherwise wasted by failed communications or retransmissions), and latency is not increased (due to retransmissions).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive a configuration that indicates, within each symbol of a plurality of symbols, an extra GI before data and a tail GI after the data. The communication manager 140 may decode first data within a first symbol of the plurality of symbols at a first time location that is based at least in part on the extra GI and the tail GI within the first symbol. The communication manager 140 may decode second data within a second symbol of the plurality of symbols at a second time location that is based at least in part on the tail GI within the second symbol.

In some aspects, the communication manager 140 may receive a configuration that indicates, within each symbol of a plurality of symbols, an extra GI before data and a tail GI after the data. The communication manager 140 may transmit first data within a first symbol of the plurality of symbols at a first time location that is based at least in part on the extra GI and the tail GI within the first symbol. The communication manager 140 may transmit second data within a second symbol of the plurality of symbols at a second time location that is based at least in part on the extra GI and the tail GI placed within the second symbol. Additionally, or alternatively, the communication manager 140 may perform one or more other operations described herein.

In some aspects, a network entity (e.g., a network node 110) may include a communication manager 150. As described in more detail elsewhere herein, the communication manager 150 may generate a configuration that indicates, within each symbol of a plurality of symbols, an extra GI before data and a tail GI after the data. The communication manager 150 may transmit the configuration. Additionally, or alternatively, the communication manager 150 may perform one or more other operations described herein.

As indicated above, FIG. 1 is provided as an example. Other examples may differ from what is described with regard to FIG. 1.

Figure 2:
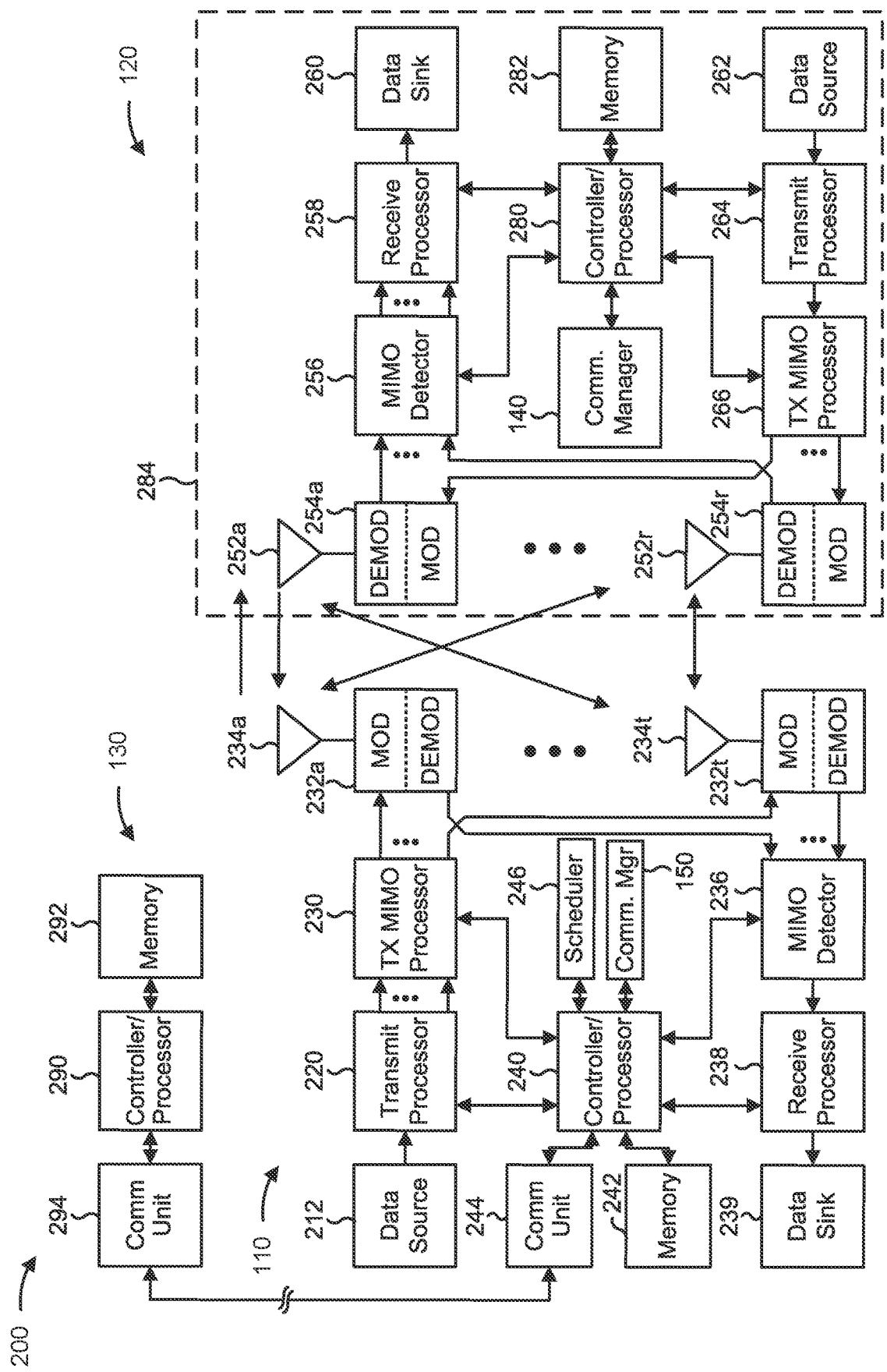
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-23).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-23).

A controller/processor of a network entity (e.g., controller/processor 240 of the network node 110), the controller/processor 280 of the UE 120, and/or any other component(s) of FIG. 2 may perform one or more techniques associated with using an extra GI, as described in more detail elsewhere herein. For example, the controller/processor 240 of the network node 110, the controller/processor 280 of the UE 120, and/or any other component(s) of FIG. 2 may perform or direct operations of, for example, process 1900 of FIG. 19, process 2000 of FIG. 20, process 2100 of FIG. 21, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1900 of FIG. 19, process 2000 of FIG. 20, process 2100 of FIG. 21, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving a configuration that indicates, within each symbol of a plurality of symbols, an extra GI before data and a tail GI after the data; means for decoding first data within a first symbol of the plurality of symbols at a first time location that is based at least in part on the extra GI and the tail GI within the first symbol; and/or means for decoding second data within a second symbol of the plurality of symbols at a second time location that is based at least in part on the tail GI within the second symbol.

In some aspects, the UE includes means for receiving a configuration that indicates, within each symbol of a plurality of symbols, an extra GI before data and a tail GI after the data; means for transmitting first data within a first symbol of the plurality of symbols at a first time location that is based at least in part on the extra GI and the tail GI within the first symbol; and/or means for transmitting second data within a second symbol of the plurality of symbols at a second time location that is based at least in part on the extra GI and the tail GI placed within the second symbol. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a network node 110) includes means for generating a configuration that indicates, within each symbol of a plurality of symbols, an extra GI before data and a tail GI after the data; and/or means for transmitting the configuration. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
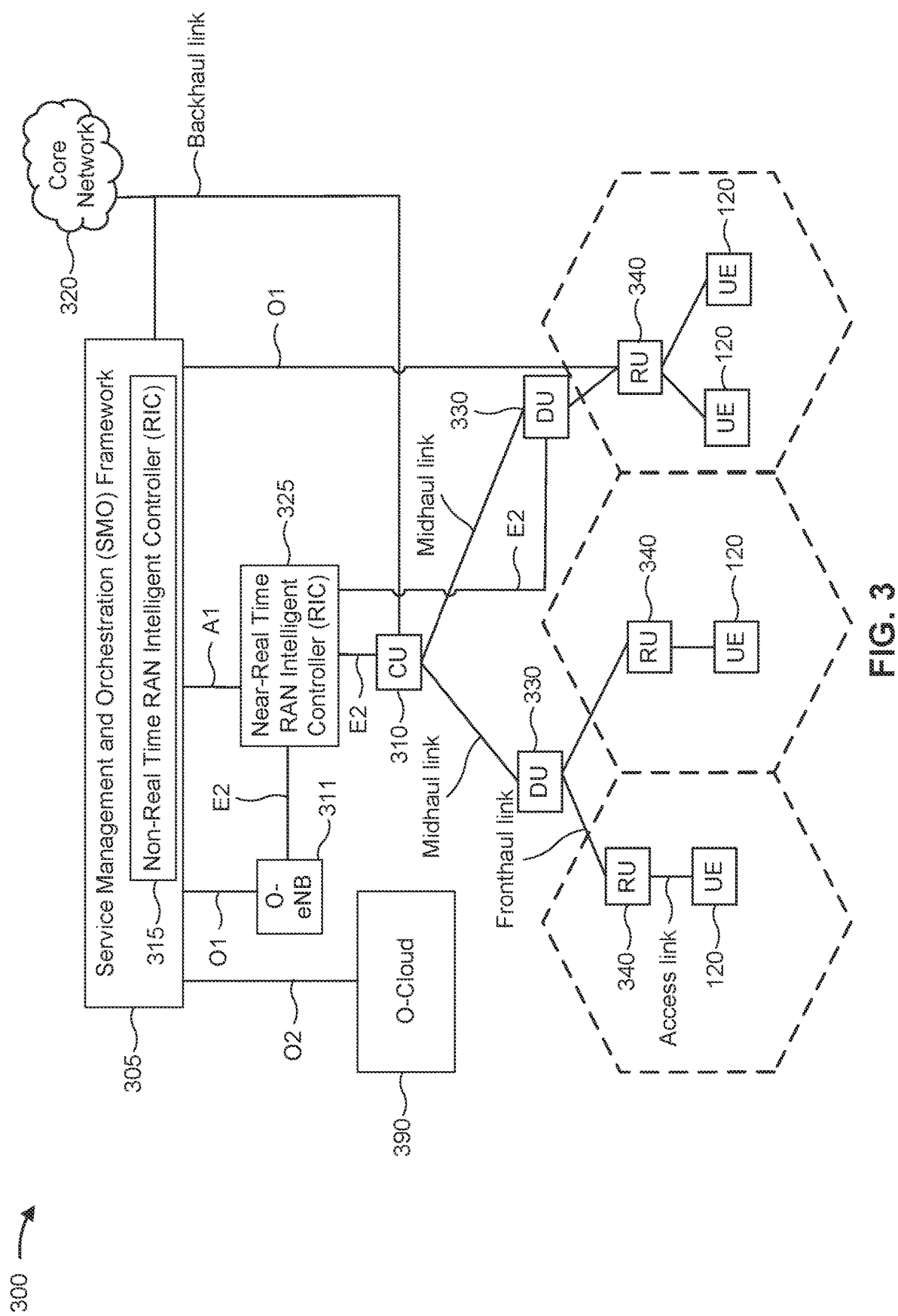
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an IFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
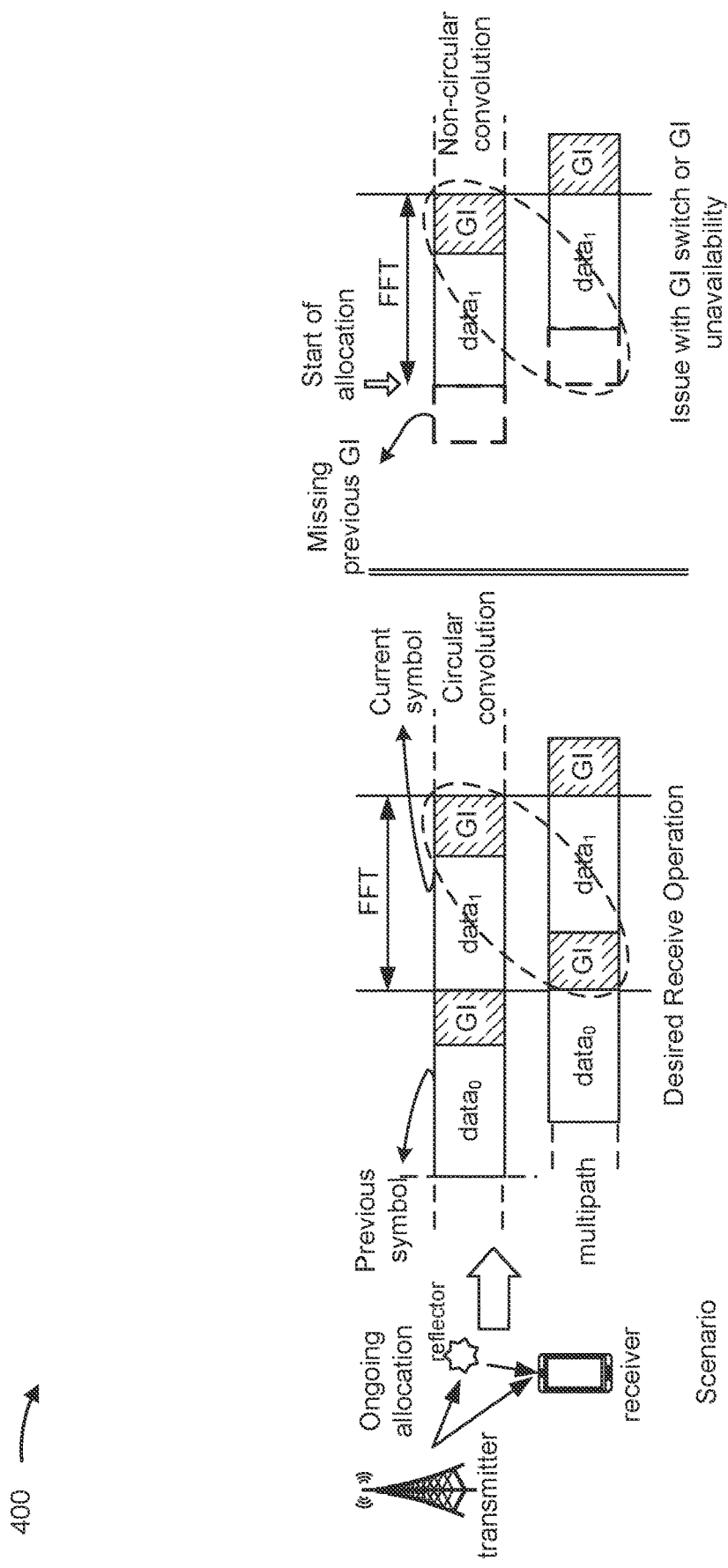
FIG. 4 is a diagram illustrating an example of using guard intervals (GIs), in accordance with the present disclosure.

FIG. 4 is a diagram illustrating an example 400 of using GIs, in accordance with the present disclosure.

A GI may include zeroes, a specific sequence (e.g., Zadoff-Chu sequence), or a copy of a portion of a reference signal. A GI sequence may be a unique word. The GI may be placed adjacent to data to mitigate interference from another communication that is close in time, such as ISI from an adjacent symbol. A GI-based waveform design may provide some benefits over a cyclic prefix (CP), which may include a copy of data before a symbol boundary. For example, a GI length may be adapted to the delay spread of different propagation delays of other receivers. A GI sequence may be used for phase noise/frequency/time tracking, and a GI sequence may be used to improve channel estimation. Given these benefits, GI-based DFT-s-OFDM may be used as a waveform.

One property of a GI waveform is that a GI uses a previous symbol's GI to enable circular convolution. Example 400 shows circular convolution, where a GI used before data by one receiver may match a GI used after data by another receiver when there are multiple paths (e.g., direct, reflected by reflector). However, also shown by example 400, the prior symbol GI may not available or may be different at specific points in time. This may be considered non-circular convolution.

As indicated above, FIG. 4 is provided as an example. Other examples may differ from what is described with regard to FIG. 4.

Figure 5:
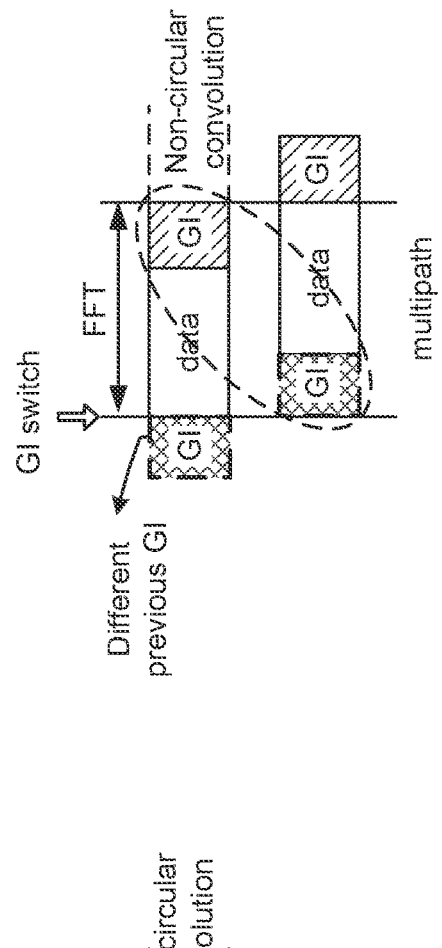
FIG. 5 is a diagram illustrating an example of non-circular convolution, in accordance with the present disclosure.
Figure 5:
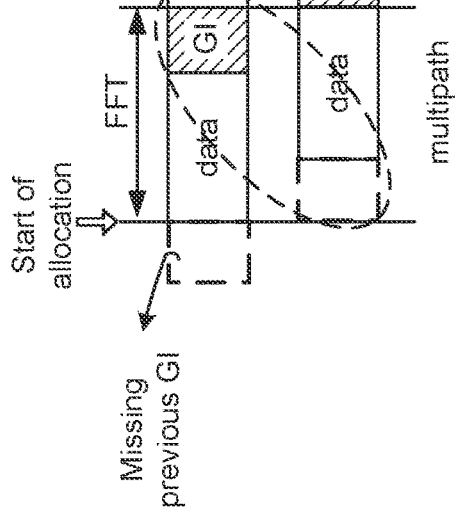
Figure 5:
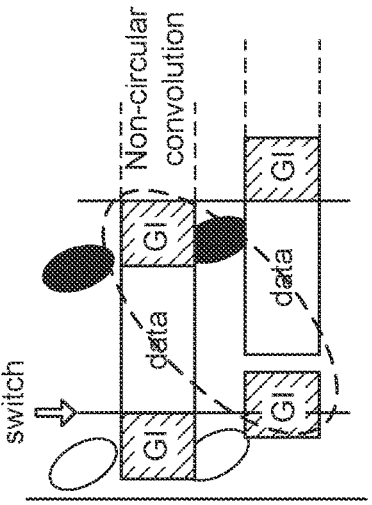

FIG. 5 is a diagram illustrating an example 500 of non-circular convolution, in accordance with the present disclosure.

There may be various scenarios where a GI may switch, or a prior GI may be unavailable, thus causing a non-circular convolution of GIs. Scenario 502 shows that at a start of a resource allocation, no previous GI may be available. Scenario 504 shows that there may be a switch of GIs, and the GI used for a slot may depend on a DMRS sequence. Scenario 506 shows that there may be a beam switch such that a beam used for a current GI may be different than a beam used for a previous GI. That is, there may be a beamforming or precoding change that causes received GI samples to be different. Other scenarios may involve different channels or symbols that use different GI sequences (e.g., for a physical downlink shared channel (PDSCH) versus for a physical downlink control channel (PDCCH)) or involve different symbols that are expected to have different levels of ISI protection. Different levels of ISI protection may involve different GI lengths (e.g., for a DMRS versus a PDSCH) to provide time distance between interfering symbols. The expectation of ISI protection may be based at least in part on a signal strength and a proximity of a neighboring symbol. The greater the expectation for ISI protection, the longer the length of the GI to provide the ISI protection. If GIs are not properly used for communications, ISI interference may cause signal degradation, which wastes signaling resources.

As indicated above, FIG. 5 is provided as an example. Other examples may differ from what is described with regard to FIG. 5.

Figure 6:
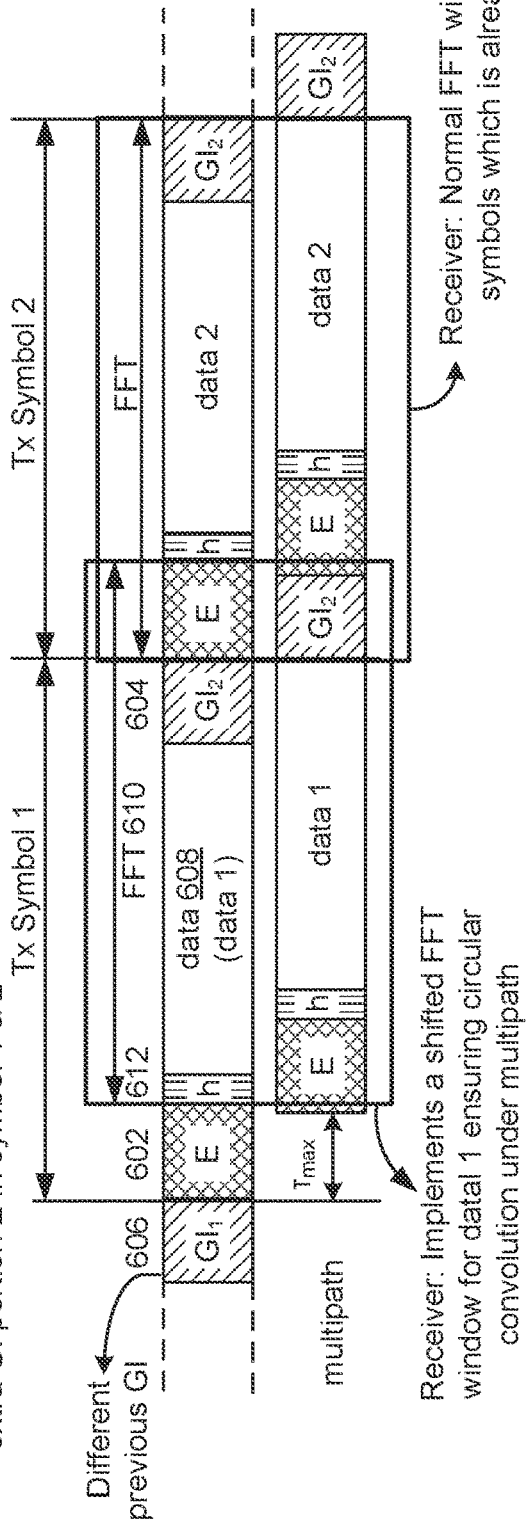
FIG. 6 is a diagram illustrating an example of using an extra GI for communications, in accordance with the present disclosure.

FIG. 6 is a diagram illustrating an example 600 of using an extra GI for communications, in accordance with the present disclosure.

According to various aspects described herein, a network entity may transmit a configuration that indicates, within each symbol of a plurality of symbols, an extra GI before data and a tail GI after the data. The extra GI may be part of a self-contained structure that mitigates the GI switching issue. The extra GI may be a dedicated GI that is an addition to a tail GI within a symbol. Example 600 shows an extra GI 602 (shown as E) within transmission (Tx) symbol 1 with data 1 608 (data n) and a tail GI 604 (shown as $G_2$). The data 608 may be a data symbol transmitting within a transmission symbol 1. The transmission symbol 1 may be one of many transmission symbols in a transmission slot.

A transmitter, such as the network entity, may transmit data within a symbol with the extra GI 602 before the data 608 and the tail GI 604 after the data 608, the extra GI 602 and the tail GI 604 being within the symbol. The tail GI 604 may be the same as the tail GI 606 (shown as $G_1$) in the previous symbol. A receiver, such as a UE, may receive the extra GI 602, the data 608, and the tail GI 604. The UE may decode the data 608 within a fast Fourier transform (FFT) window 610 at a time location that is based at least in part on the tail GI 604. The UE may shift the FFT window 610 based at least in part on the extra GI to include the data 608. The FFT window 610 may start at an end of the extra GI 602. The UE may start decoding the data 608 at an end of the extra GI 602. The FFT window 610 may also be shifted to be within the extra GI 602 to account for any ISI. The extra GI 602 may enable the FFT window 610 to include the data of other UEs or paths of multiple paths. The network entity may select the length of the extra GI 602 to include any maximum propagation delay difference ($T_{max}$) between UEs or paths.

By using the extra GI, the network entity and the UE may help to ensure the decoding of the data while accounting for variations in timing of when the data is received. The variation may be due to the time division duplexing (TDM) or frequency division duplexing (FDM) of multiple users, a slot-dependent GI, higher/lower ISI protection for front-loaded symbols, or beam sweeping. As a result, communications are not degraded, signaling resources are conserved (not otherwise wasted by failed communications or retransmissions), and latency is not increased (due to retransmissions).

The UE may decode a next data symbol at a time location that is based at least in part on the tail GI used in the next symbol or slot (e.g., Tx symbol 2). The UE may use the next FFT window for decoding the next data symbol.

In some aspects, the transmitter may transmit the data based at least in part on the extra GI 602 and further based at least in part on a head GI 612 (shown as h). The head GI 612 may help to further account for any other ISI (e.g., due to energy leakage caused by sidelobes of the data 608 due to up-sampling in the GI-DFT-s-OFDM transmitter). The head GI 612 may restrict the energy leakage into the extra GI 602 or the tail GI 604 and reduce the non-circular convolution. A minimal length of head GI 612 may be expected to accomplish this objective. The head GI 612 may place the data 608 further within the FFT window 610 and mitigate any interference before the data 608 is decoded. By using the head GI, the network entity and the UE may reduce interference at the edges of the data 608, which improves communications and conserves signaling resources.

In some aspects, the network entity may determine a location of the self-contained structure (e.g., extra GI, data symbol, tail GI) within a transmission symbol or slot. The network entity may configure one or more locations for extra GIs within a slot. In some aspects, the network entity may configure the length of the extra GI based at least in part on how much ISI protection is to be used for the data. For example, the network entity may use a measurement of ISI, or measurements that may indicate ISI to determine a length of the extra GI. The length of the extra GI may be equal to, less than, or more than the length of tail GI based at least in part on whether the data is expected to have the same, less, or more protection from ISI than another symbol (e.g., data n+1), respectively. The length of the extra GI may be the maximum of the length for $GI_1$ or $GI_2$. The extra GI may be an overhead for only data n+1 if data n is a reference signal (e.g., DMRS) and the extra GI is part of the DMRS. Otherwise, the extra GI may be an overhead in both data symbols (e.g., when both data are PDSCH). In this case, the UE may decode the data further based at least in part on the extra GI within the symbol.

In some aspects, the extra GI may be expected to account for the delay spread in the channel. The network entity may configure a length of the extra GI based at least in part on the delay spread of the channel seen by the first symbol.

In some aspects, a reference signal may include samples that are identical to the extra GI and a data channel where the extra GI is inserted. The extra GI may be used with a tail GI in any combination of reference signals (e.g., channel state information reference signal (CSI-RS), DMRS) and channels (e.g., PDSCH, PDCCH, physical uplink shared channel (PUSCH), physical uplink control channel (PUCCH)).

As indicated above, FIG. 6 is provided as an example. Other examples may differ from what is described with regard to FIG. 6.

Figure 7:
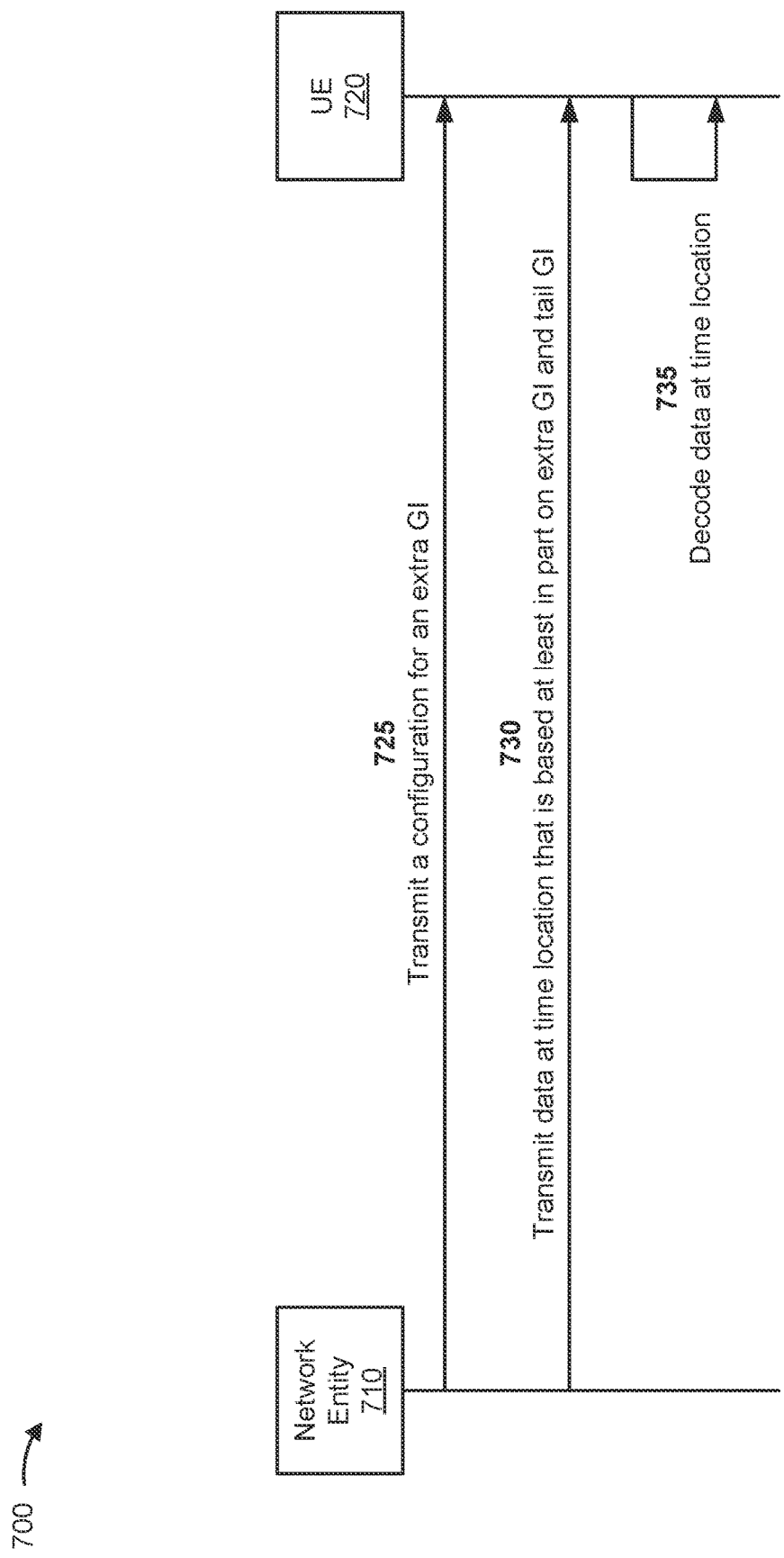
FIG. 7 is a diagram illustrating an example associated with using an extra GI for communications, in accordance with the present disclosure.

FIG. 7 is a diagram illustrating an example 700 associated with using an extra GI for communications, in accordance with the present disclosure. As shown in FIG. 7, a network entity 710 (e.g., network node 110) and a UE (e.g., UE 120) may communicate with one another via a wireless network (e.g., wireless network 100).

Example 700 shows signaling for using an extra GI. As shown by reference number 725, the network entity 710 may transmit a configuration for using an extra GI. The configuration may indicate, within each symbol of a plurality of symbols, an extra GI, a tail GI, and optionally a head GI between the extra GI and the data in the symbol. The configuration may indicate, based at least in part on the extra GI and any head GI, a time location to decode the data. In some aspects, the configuration may indicate a sequence of the extra GI and/or a length of the extra GI. The sequence and/or length may be based at least in part on a length of the tail GI and ISI information. ISI information may include an amount of measured or expected ISI, a required GI for the ISI, or other information for mitigating ISI. In some aspects, the configuration may indicate locations in the slots for one or more extra GIs.

As shown by reference number 730, the network entity 710 may transmit data within a symbol at a time location that is based at least in part on the extra GI and the tail GI. As shown by reference number 735, the UE 720 may decode the data at the time location. Alternatively, in some aspects, the UE 720 may transmit the data at the time location and the network entity 710 may decode the data at the time location. In some aspects, the transmitter and the receiver may be UEs communicating over a sidelink.

As indicated above, FIG. 7 is provided as an example. Other examples may differ from what is described with respect to FIG. 7.

Figure 8:
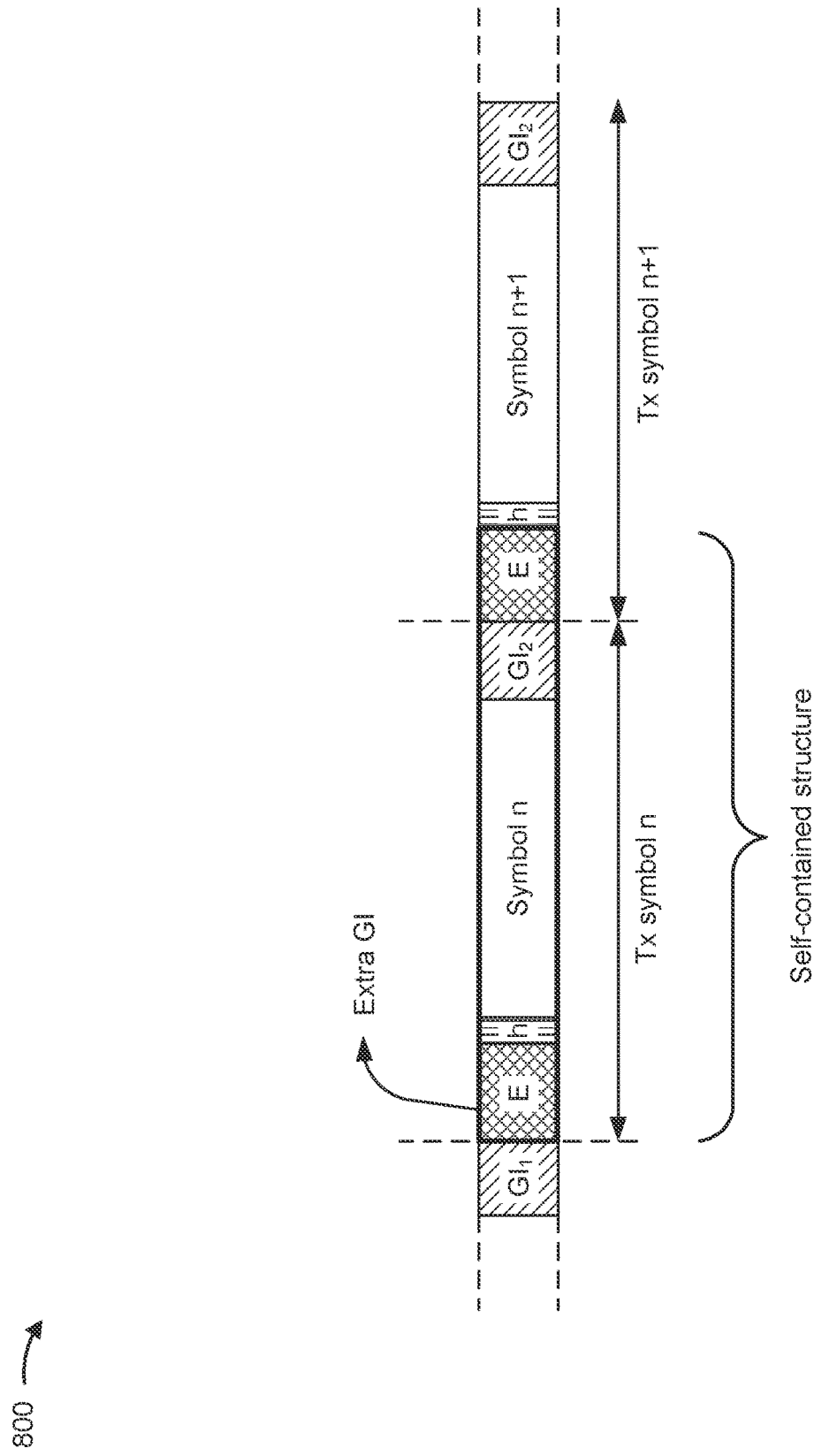
FIG. 8 is a diagram illustrating an example of using extra GIs, in accordance with the present disclosure.

FIG. 8 is a diagram illustrating an example 800 of using extra GIs, in accordance with the present disclosure.

Example 800 shows extra GIs, data symbols, and tail GIs in a first symbol and a second symbol. A self-contained structure may include an extra GI, a head GI (optional), data, and a tail GI in a first symbol and the extra GI in a second symbol. In some aspects, if a location of the extra GI is not signaled, then the location may be implicit (e.g., before the starts of the first symbol and the second symbol). If the extra GI sequence is DMRS-based, then only non-DMRS locations may be expected to be signaled (e.g., symbol n+1). The network entity 710 may indicate multiple locations of the extra GI in a slot with the same or different lengths.

In some aspects, the network entity 710 may indicate a required extra GI length. In some aspects, the network entity 710 may indicate samples to use in the extra GI. If all GIs are based on DMRSs, including the extra GI, then no extra signaling is required. Alternatively, the network entity 710 may indicate to use a specific sequence in the extra GI. The presence of a self-contained structure may be tied to a switch of a beam in the slot or a switch of the channels.

As indicated above, FIG. 8 is provided as an example. Other examples may differ from what is described with regard to FIG. 8.

Figure 9:
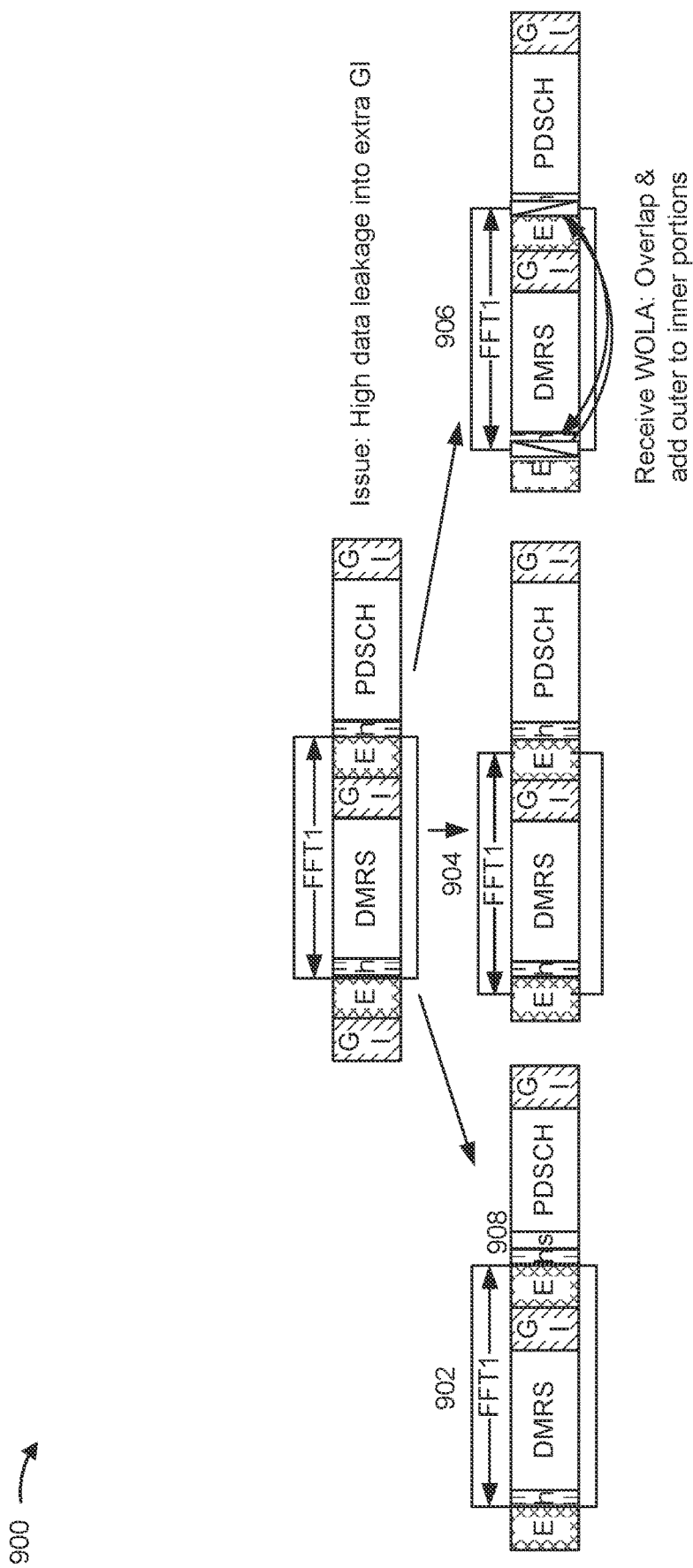
FIG. 9 is a diagram illustrating an example of using extra GIs, in accordance with the present disclosure.

FIG. 9 is a diagram illustrating an example 900 of using extra GIs, in accordance with the present disclosure.

Due to up-sampling operations of DFT-IFFT, the extra GI may have leakage from data tones. This leakage can cause the input of shifted FFT to be non-circular. The head GI may reduce this leakage, but further mechanism to reduce this leakage may be used.

In some aspects, as shown by scenario 902, the transmitter may add dedicated suppression samples (shown as s 908) on the edges of data tones. In some aspects, as shown by scenario 904, the receiver may move the FFT window slightly away from the edge of data samples. In some aspects, as shown by scenario 906, the UE may apply a Weighted Overlap & Add (WOLA) outside the data and the tail GI to suppress asymmetric leakage.

As indicated above, FIG. 9 is provided as an example. Other examples may differ from what is described with regard to FIG. 9.

The aspects described herein may be used for a variety of scenarios. FIGS. 10-18 show examples of such scenarios.

Figure 10:
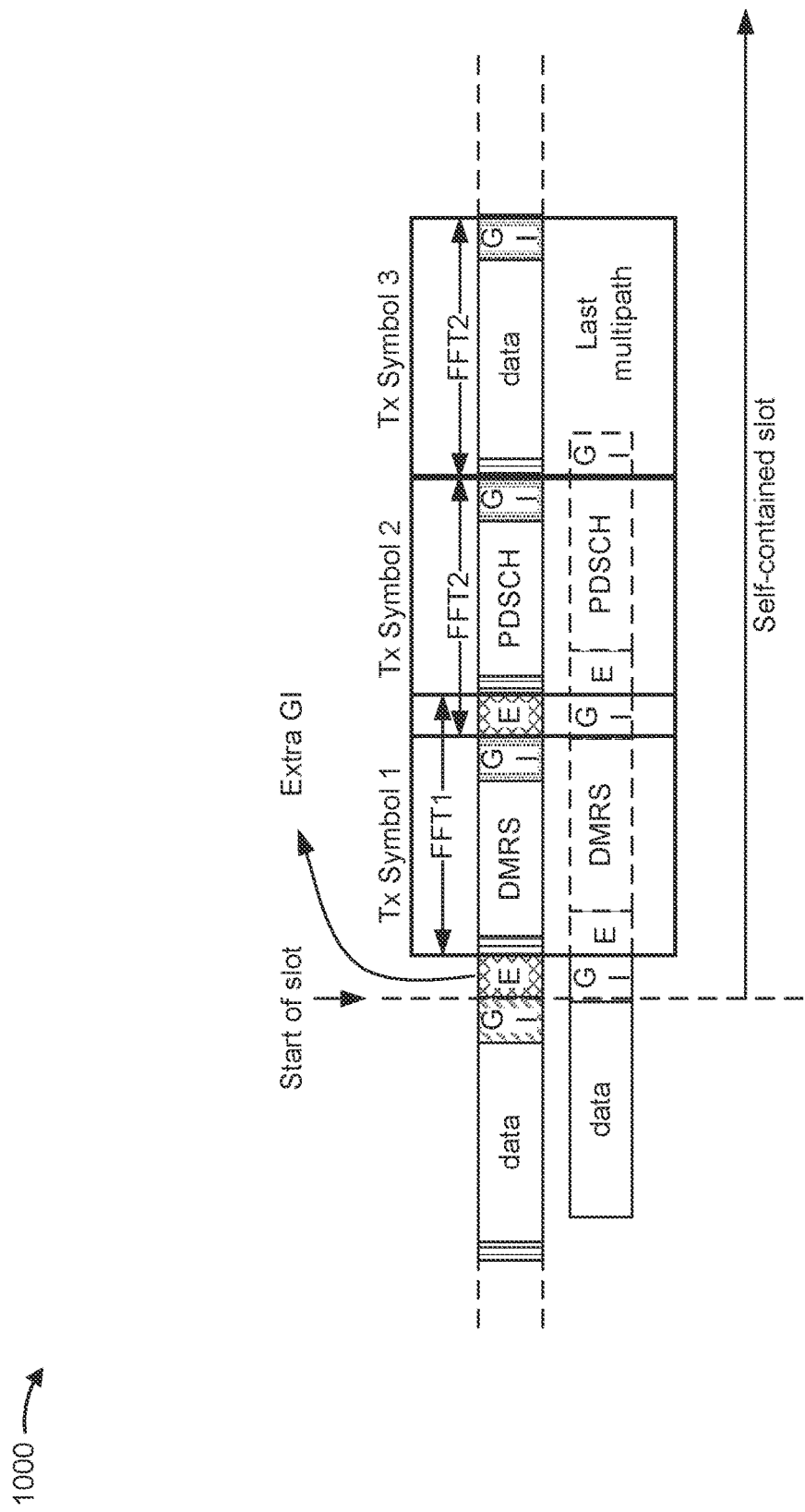
FIG. 10 is a diagram illustrating an example of using extra GIs, in accordance with the present disclosure.

FIG. 10 is a diagram illustrating an example 1000 of using extra GIs, in accordance with the present disclosure.

A tail GI sequence may switch every slot, if it is based on a DMRS sequence that varies each slot (e.g., randomized). The tail GI sequence may switch at a slot boundary (shown by "start of slot"). In some aspects, the transmitter and receiver may use an extra GI to maintain a previous slot tail GI. For example, as shown by example 1000, the transmitter may transmit data using an extra GI in Tx symbol 1 and Tx symbol 2 of a slot. If symbol 1 is DMRS and the tail GI is an end of DMRS, then the UE changes symbol 2. The receiver may shift the FFT window for symbol 1. By using the extra GI in symbol 1 and symbol 2 forming a self-contained structure, symbol 1 may be protected from ISI from the last symbol of the previous slot, which has a different GI sequence. When symbol 1 is a DMRS symbol, this may prevent the quality of channel estimation from degrading due to ISI.

As indicated above, FIG. 10 is provided as an example. Other examples may differ from what is described with regard to FIG. 10.

Figure 11:
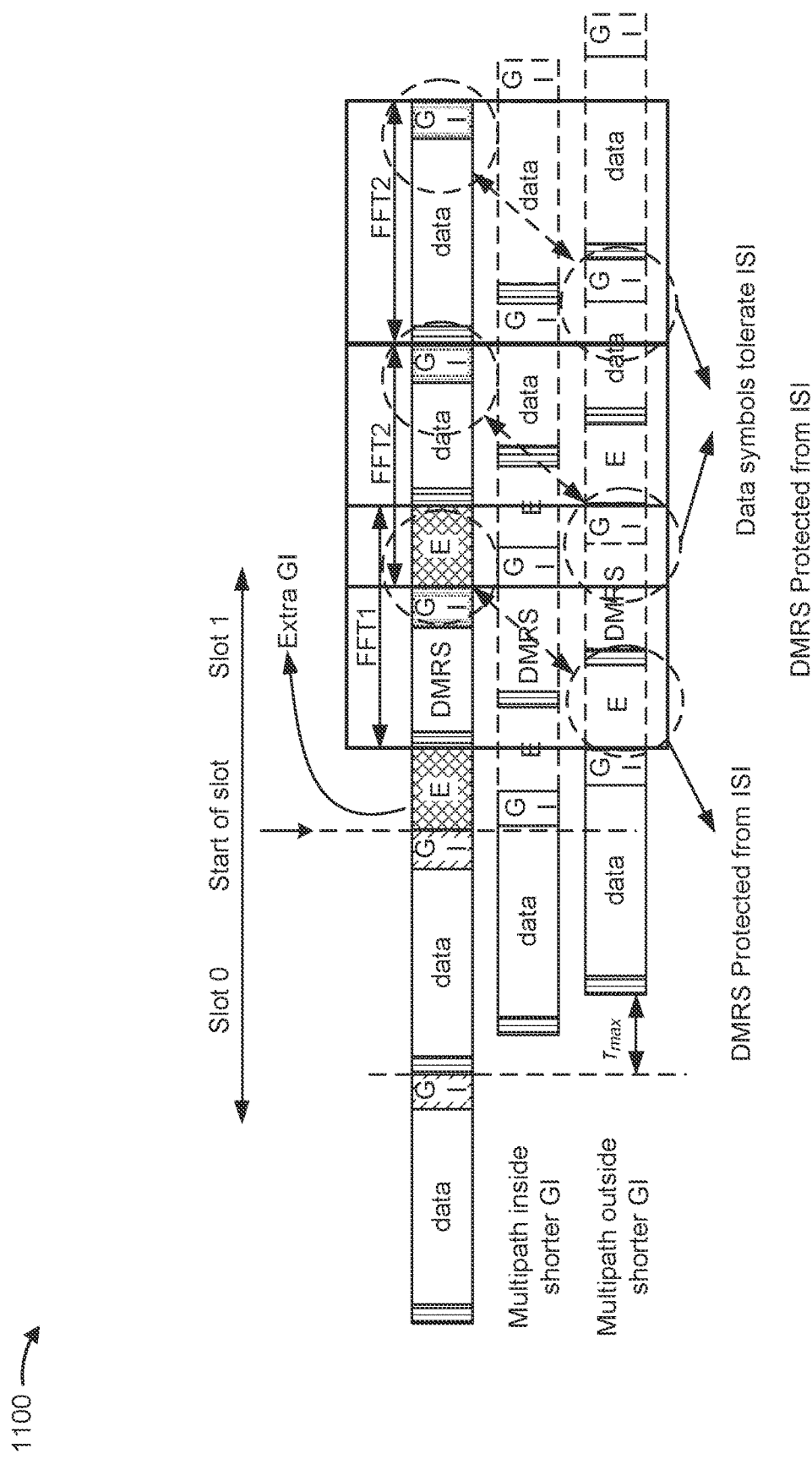
FIG. 11 is a diagram illustrating an example of using extra GIs, in accordance with the present disclosure.

FIG. 11 is a diagram illustrating an example 1100 of using extra GIs, in accordance with the present disclosure.

In some aspects, the transmitter may use an extra GI to protect a DMRS. The transmitter may reduce the GI length (tolerating ISI) at a low MCS to obtain a coding or throughput gain. The increased ISI may be tolerable in a PDSCH but the DMRS may be expected to be more protected to prevent degradation in channel estimation quality. The transmitter may use a longer extra GI to protect the first symbol (e.g., DMRS for channel estimation). The longer extra GI before the DMRS is shown in example 1100.

In some aspects, the length of the extra GI is longer or shorter than the length of the tail GI based at least in part on the ISI protection to be used for a first symbol being more or less than the ISI protection to be used for a second symbol. For example, the length of the extra GI may be longer than the length of the tail GI if more ISI protection is to be used for the first symbol than for the second symbol. The length of the extra GI may be shorter than the tail GI if less ISI protection is to be used for the first symbol than for the second symbol. The GI length adjustments may protect the DMRS with a longer extra GI.

As indicated above, FIG. 11 is provided as an example. Other examples may differ from what is described with regard to FIG. 11.

Figure 12:
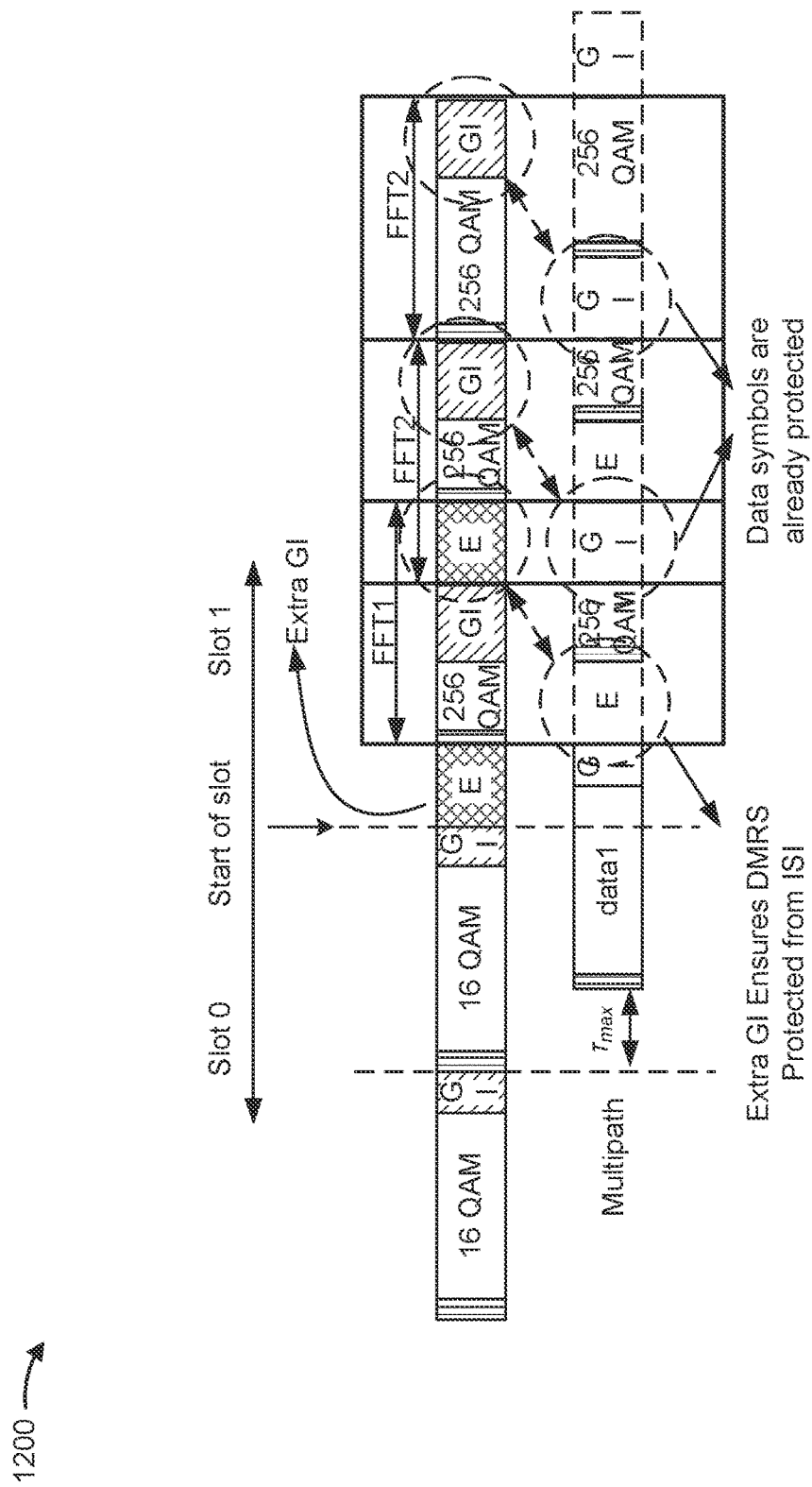
FIG. 12 is a diagram illustrating an example of using extra GIs, in accordance with the present disclosure.

FIG. 12 is a diagram illustrating an example 1200 of using extra GIs, in accordance with the present disclosure.

In some aspects, the extra GI length or sequence may switch due to the MCS and/or the channel change. The transmitter may adapt the GI length to the MCS, where a shorter extra GI may be used for low MCS and a longer extra GI may be used for a high MCS. Alternatively, the GI length may be changed as per the channel (e.g., PDSCH versus PDCCH) as different channels may be expected to have different ISI protection. The receiver may use a self-contained structure with extra GI at the point of the switch (e.g., start of slot with new MCS and GI length) to prevent ISI to the symbol immediately following the GI switch. Example 1200 shows that a shorter tail GI may be used for a 16-quadrature amplitude modulation (QAM) but a longer tail GI may be used for a 256-QAM symbol. The first and second 256-QAM symbols may implement a longer extra GI, comparable to the tail GI of the 256-QAM. By using the extra GI in the first and second symbols corresponding to the 256-QAM MCS, the first symbol may be protected from ISI. The FFT window FFT1 used to detect the first symbol may be a shifted FFT window while a normal FFT window FFT2 that is aligned to the symbol boundaries may be used to detect the second symbol. Other 256-QAM symbols except the first symbol may already be protected from ISI due to the longer tail GI of the 256 QAM symbols that is able to handle the maximum delay spread $T_{max}$ in the channel.

As indicated above, FIG. 12 is provided as an example. Other examples may differ from what is described with regard to FIG. 12.

Figure 13:
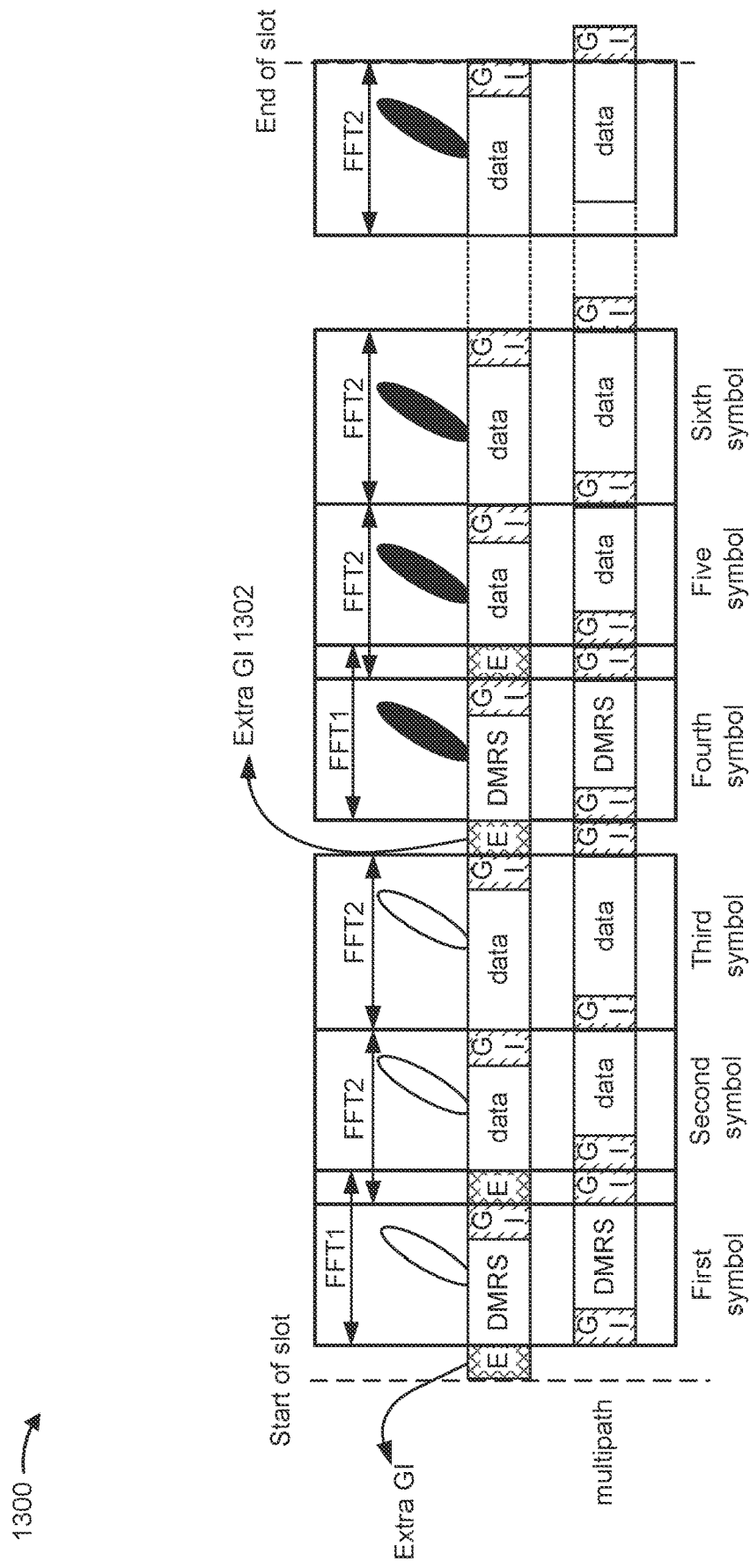
FIG. 13 is a diagram illustrating an example of using extra GIs, in accordance with the present disclosure.

FIG. 13 is a diagram illustrating an example 1300 of using extra GIs, in accordance with the present disclosure.

A receiver may experience non-circularity of tail GIs due to a beam switch within a symbol. In some aspects, if there is non-circular GI reception within a slot for the same user (e.g., due to DMRS beam sweeping), then the transmitter may use multiple extra GIs within a slot to maintain circularity at the point of the beam switch.

Example 1300 shows that a first symbol and a fourth symbol in a slot are DMRS symbols, but with different beams (e.g., different transmit beam or different receive beam). Due to beam switch (from light beam to dark beam) between the third and fourth symbols, the received GI samples in the fourth symbol may not match with the received GI samples from the third symbol, causing non-circular convolution for the fourth symbol DMRS and creating ISI. Similarly, the first symbol DMRS may not have the same GI samples available in the prior slot (as shown FIG. 10). By implementing the self-contained structure with extra GIs 1302 for the first symbol and the fourth symbol, both symbols are protected from ISI and degradation in channel estimation quality is prevented.

As indicated above, FIG. 13 is provided as an example. Other examples may differ from what is described with regard to FIG. 13.

Figure 14:
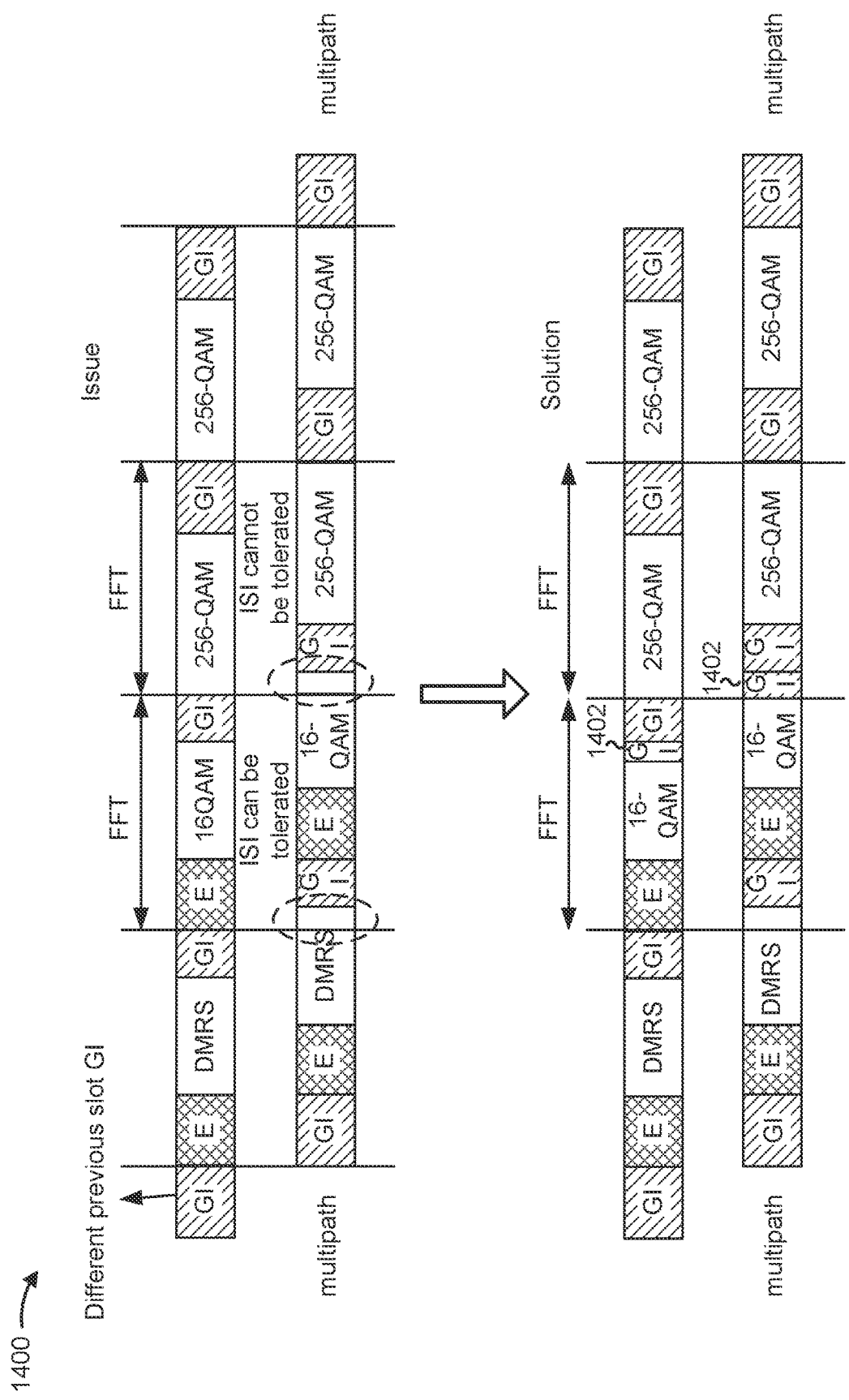
FIG. 14 is a diagram illustrating an example of using extra GIs, in accordance with the present disclosure.

FIG. 14 is a diagram illustrating an example 1400 of using extra GIs, in accordance with the present disclosure.

In some aspects, a transmitter may switch GI lengths in the same slot, for lower overhead. The transmitter may increase or decrease the extra GI length or the tail GI as the MCS changes within a slot. Example 1400 shows the MCS changing from 16-QAM to 256-QAM. A lower MCS can tolerate a GI shorter than the delay spread but a higher MCS would involve a longer GI. Some protection may be expected when switching to a higher MCS (e.g., 16-QAM to 256-QAM).

In some aspects, as a low overhead solution, the transmitter may generate a 256-QAM longer tail GI sequence by a pre-DFT concatenation of a short extra GI and the 16-QAM tail GI sequence. That is, the transmitter may transmit data further based at least in part on a short extra GI, which may account for the longer tail GI used for a higher MCS. Example 1400 shows the use of a short extra GI 1402, that with the short tail GI of the 16-QAM equates to or accounts for the long tail GI of the 256-QAM. This design may be useful when GI sequences with different lengths are derived from a same longer sequence. Concatenating a short extra GI 1402 to the shorter tail GI of the 16-QAM symbol leads to effectively creating the long GI associated with the 256-QAM symbol.

In some aspects, the configuration may indicate a first short extra GI that is added next to (e.g., directly adjacent in time) the tail GI within a first symbol, based at least in part on a difference between a length of the tail GI the first symbol and a length of the tail GI of the second symbol. One or more of the first time location or the second time location is further based at least in part on the first short extra GI, and a sum of the extra GI and the tail GI within the first symbol may be equivalent to the tail GI within the second symbol.

As indicated above, FIG. 14 is provided as an example. Other examples may differ from what is described with regard to FIG. 14.

Figure 15:
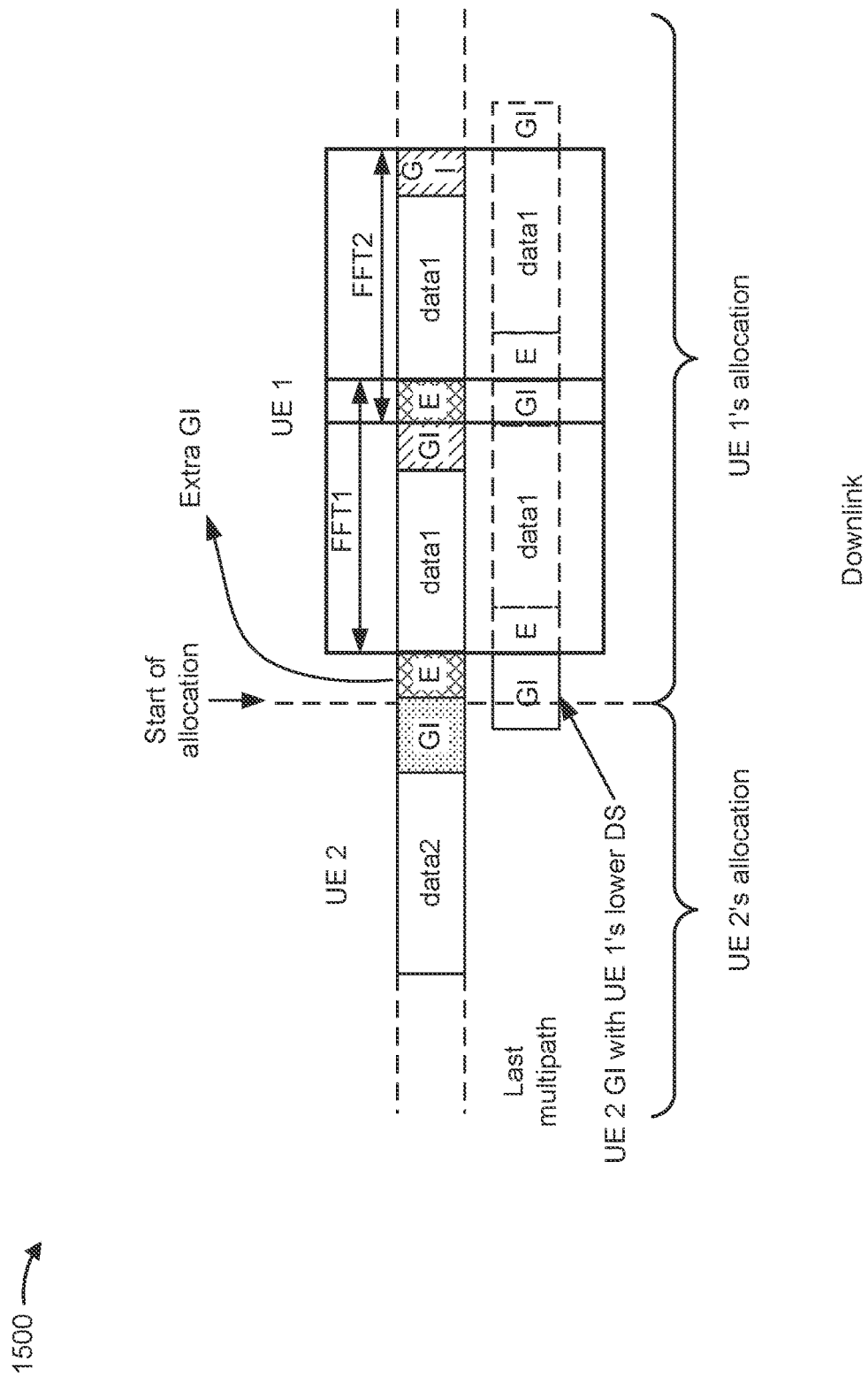
FIG. 15 is a diagram illustrating an example of using extra GIs, in accordance with the present disclosure.

FIG. 15 is a diagram illustrating an example 1500 of using extra GIs, in accordance with the present disclosure.

A GI may be unavailable due to a user switch in downlink. Multiple UEs may switch in a TDM fashion. Each UE may use a different tail GI sequence. In some aspects, the transmitter may use an extra GI when a user starts a new allocation to prevent ISI to the first symbol. Example 1500 shows the use of an extra GI at a start of the allocation of UE 1. The extra GI may be used at a slot boundary or within a slot. UEs can use different GI lengths. Any previous UE 2 transmission may be shifted only by a UE's delay spread (e.g., UE 1's delay spread). Thus, the length of extra GI for UE 1 may not be affected by the channel delay spread of other UEs operating in TDM with UE 1.

As indicated above, FIG. 15 is provided as an example. Other examples may differ from what is described with regard to FIG. 15.

Figure 16:
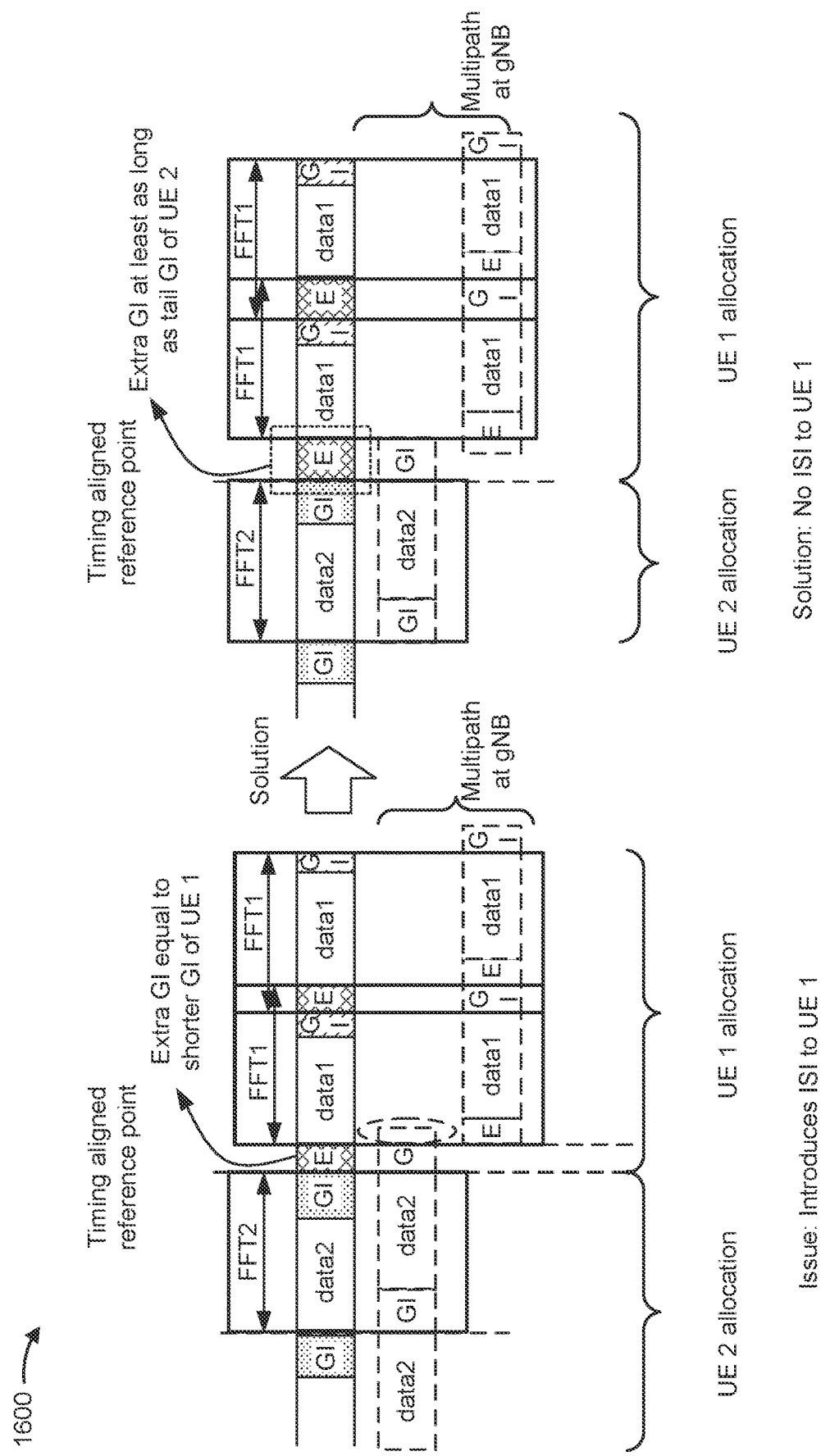
FIG. 16 is a diagram illustrating an example of using extra GIs, in accordance with the present disclosure.

FIG. 16 is a diagram illustrating an example 1600 of using extra GIs, in accordance with the present disclosure.

A previous GI may be unavailable due to a UE switch in uplink in TDM. UE switches in uplink may introduce ISI due to different delay spreads among the UEs. In some aspects, the transmitter may increase a length of the extra GI to be at least as long as a prior UE tail GI. Example 1600 shows that selecting the extra GI length equal to the tail GI length of UE 1, which is shorter than the delay spread of UE 2, whose transmission immediately precedes UE 1, leads to ISI for the first symbol of UE 1. To prevent the ISI, the extra GI may increase in length to be as long as the tail GI of another user.

As indicated above, FIG. 16 is provided as an example. Other examples may differ from what is described with regard to FIG. 16.

Figure 17:
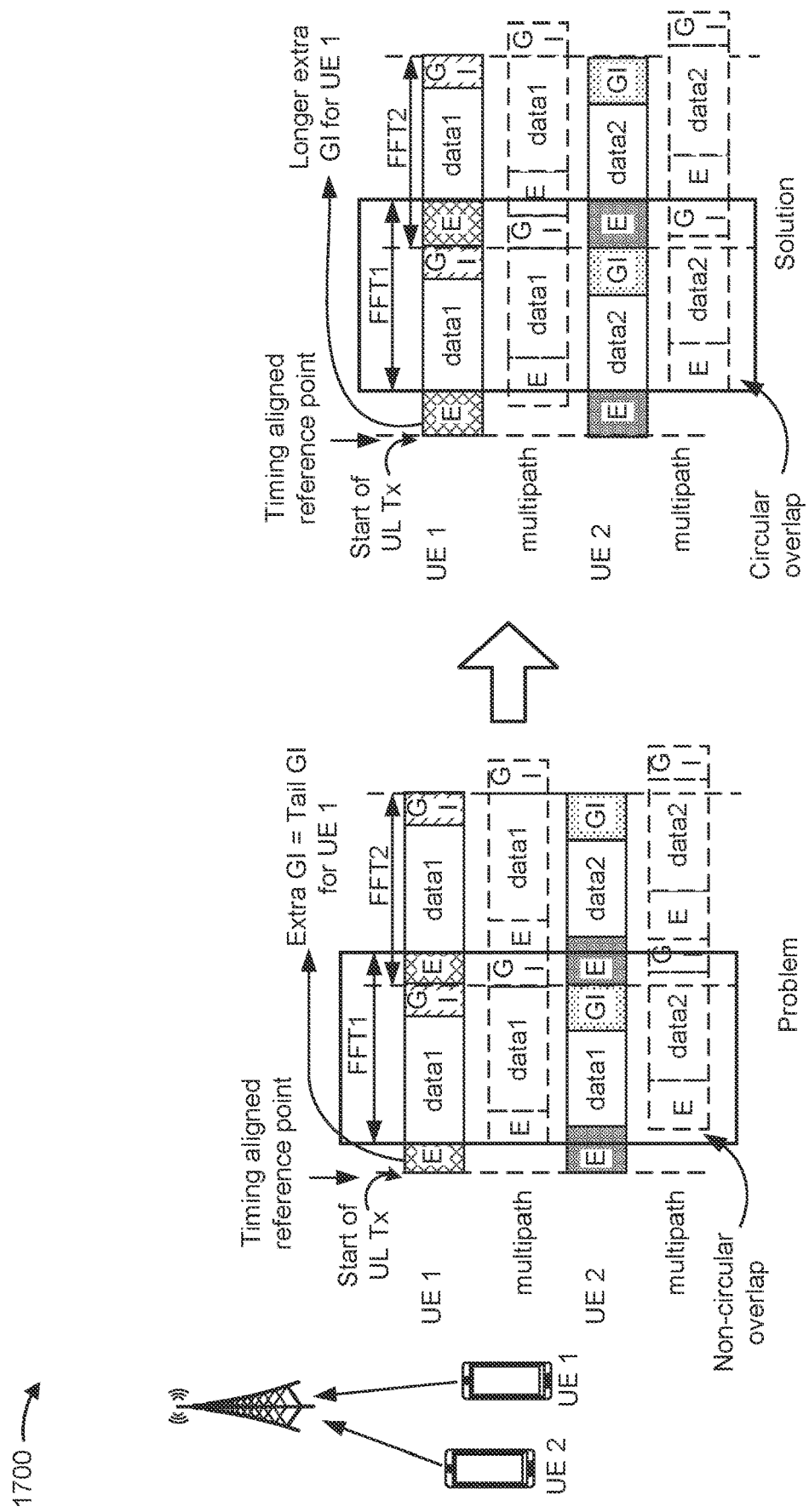
FIG. 17 is a diagram illustrating an example of using extra GIs, in accordance with the present disclosure.

FIG. 17 is a diagram illustrating an example 1700 of using extra GIs, in accordance with the present disclosure.

A GI may be unavailable due to a UE switch in uplink. Multiple UEs may switch in an FDM fashion. UEs that use different GI lengths may be FDMed in uplink without an impact on the block error rate (BLER). UEs may use an extra GI in some symbols to protect data from ISI (e.g., GI sequence is randomized in every slot and the first symbol of the slot is expected to have ISI protection). However, UEs being FDMed may be expected to use a common length of extra GI. Otherwise, some UEs may still face non-circularity in the FFT window. Example 1700 shows the use of an extra GI at a start of a transmission symbol. The extra GI for UE 1 may be a longer GI to account for the extra GI lengths of other UEs. By increasing the length of the extra GI of UE 1 to be as long as the extra GI of UE 2, ISI to the first symbol of UE 2 when using FFT window FFT1 can be prevented.

As indicated above, FIG. 17 is provided as an example. Other examples may differ from what is described with regard to FIG. 17.

Figure 18:
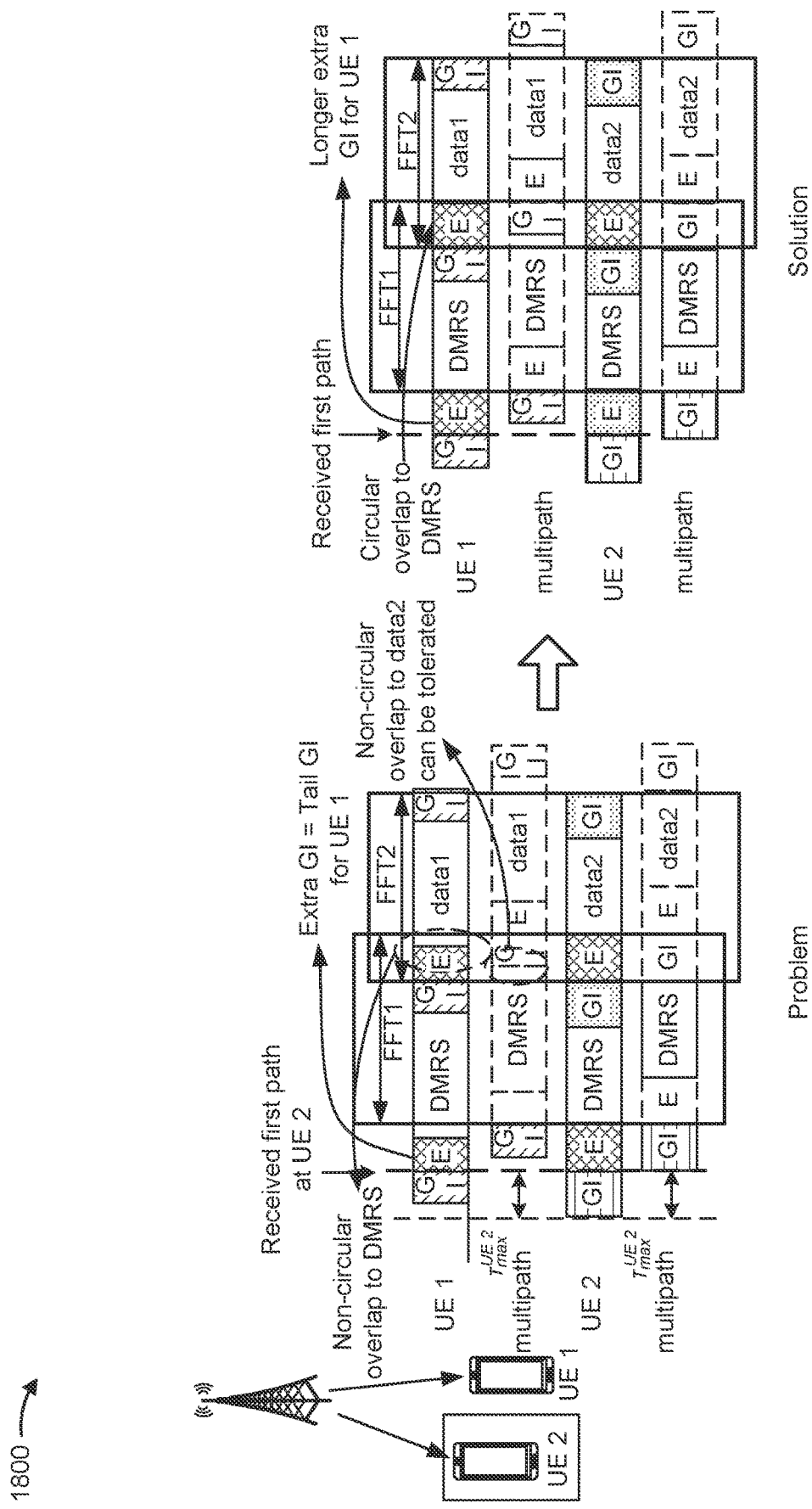
FIG. 18 is a diagram illustrating an example of using extra GIs, in accordance with the present disclosure.

FIG. 18 is a diagram illustrating an example 1800 of using extra GIs, in accordance with the present disclosure.

UEs with different tail GI lengths can be FDMed in downlink. A prior GI may be unavailable (e.g., at the beginning of a slot) and each FDMed UE may implement an extra GI to prevent ISI to its symbol(s). In some aspects, if FDMed UEs choose their extra GI lengths independently, it may lead to ISI for some UEs. The network may instead configure the same (e.g., longer) extra GI length for all FDMed UEs to protect the symbol with extra GI (e.g., DMRS) from ISI. Example 1800 shows two UEs, UE 1 and UE 2 being FDMed in downlink and having different tail GI lengths and different extra GI lengths. Example 1800 shows the received signals at UE 2. If UE 1 uses a shorter extra GI in line with its shorter tail GI, while UE 2 uses a longer extra GI in line with its longer tail GI, then the first symbol (e.g., DMRS) may face non-circularity in the FFT window FFT1. Although the same problem occurs for the second symbol (e.g., data) in the FFT window FFT2, non-circularity for the data symbol may be tolerated while non-circularity for the DMRS may not be tolerated. To resolve this issue, the network may configure UE 1 to use a longer extra GI to match the extra GI length of UE 2. The longer extra GI at UE 1 may protect the first symbol (e.g., DMRS) of UE 2 from ISI.

As indicated above, FIG. 18 is provided as an example. Other examples may differ from what is described with regard to FIG. 18.

Figure 19:
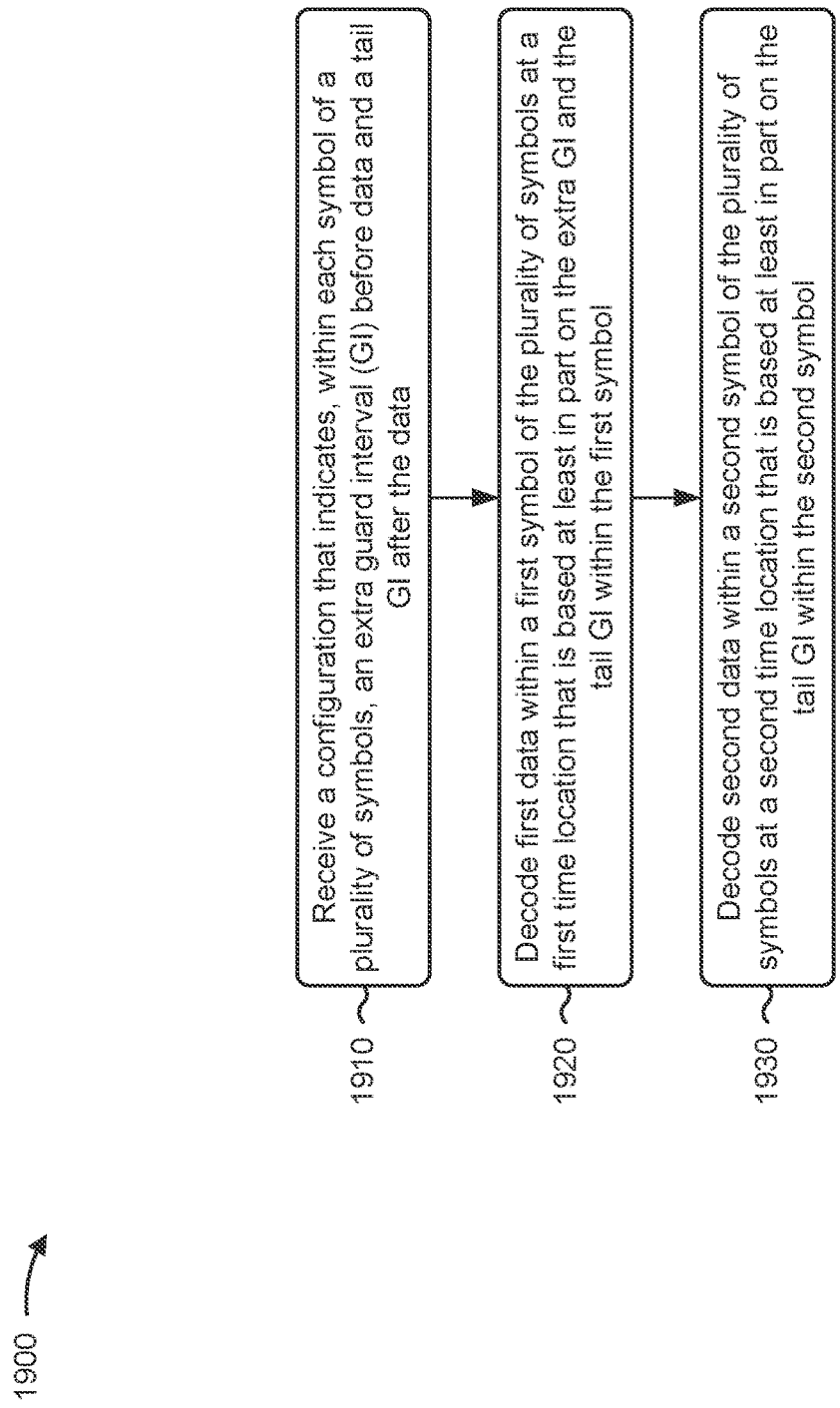
FIG. 19 is a diagram illustrating an example process performed, for example, by a UE, in accordance with the present disclosure.

FIG. 19 is a diagram illustrating an example process 1900 performed, for example, by a UE, in accordance with the present disclosure. Example process 1900 is an example where the UE (e.g., UE 120, UE 720) performs operations associated with using an extra GI.

As shown in FIG. 19, in some aspects, process 1900 may include receiving a configuration that indicates, within each symbol of a plurality of symbols, an extra GI before data and a tail GI after the data (block 1910). For example, the UE (e.g., using reception component 2202 and/or communication manager 2206, depicted in FIG. 22) may receive a configuration that indicates, within each symbol of a plurality of symbols, an extra GI before data and a tail GI after the data, as described above.

As further shown in FIG. 19, in some aspects, process 1900 may include decoding first data within a first symbol of the plurality of symbols at a first time location that is based at least in part on the extra GI and the tail GI within the first symbol (block 1920). For example, the UE (e.g., using communication manager 2206, depicted in FIG. 22) may decode first data within a first symbol of the plurality of symbols at a first time location that is based at least in part on the extra GI and the tail GI within the first symbol, as described above.

As further shown in FIG. 19, in some aspects, process 1900 may include decoding second data within a second symbol of the plurality of symbols at a second time location that is based at least in part on the tail GI within the second symbol (block 1930). For example, the UE (e.g., using communication manager 2206, depicted in FIG. 22) may decode second data within a second symbol of the plurality of symbols at a second time location that is based at least in part on the tail GI within the second symbol, as described above.

Process 1900 may include additional aspects, such as any single aspect or any combination of aspects described below and/or in connection with one or more other processes described elsewhere herein.

In a first aspect, process 1900 includes shifting an FFT window for decoding the first data such that the FFT window includes the first, where the FFT window that is shifted includes the first data, and the FFT window that is shifted starts at an end of or within the extra GI within the first symbol.

In a second aspect, alone or in combination with the first aspect, the configuration indicates, within each symbol of the plurality of symbols, a head GI between the extra GI and the data in the symbol, and the first time location is further based at least in part on the head GI in the first symbol.

In a third aspect, alone or in combination with one or more of the first and second aspects, the configuration indicates one or more of a sequence of the extra GI or a length of the extra GI that is based at least in part on a length of the tail GI and inter-symbol interference information.

In a fourth aspect, alone or in combination with one or more of the first through third aspects, the first symbol is a reference signal symbol, and the second symbol is a physical channel symbol.

In a fifth aspect, alone or in combination with one or more of the first through fourth aspects, the first symbol is a first physical channel symbol, where the second symbol is a second physical channel symbol, and the second time location is further based at least in part on the extra GI within the second symbol.

In a sixth aspect, alone or in combination with one or more of the first through fifth aspects, the configuration indicates a first location within a slot for the extra GI.

In a seventh aspect, alone or in combination with one or more of the first through sixth aspects, the configuration indicates a second location within the slot for another extra GI.

In an eighth aspect, alone or in combination with one or more of the first through seventh aspects, the first time location is further based at least in part on one or more of a dedicated suppression sample located at an edge of a data tone, shifting an FFT window for the first data away from an edge of the first data, or an application of one or more weighted overlap and add portions placed within the first symbol.

In a ninth aspect, alone or in combination with one or more of the first through eighth aspects, decoding the first data and decoding the second data includes decoding the first data and decoding the second data based at least in part on a sequence of the tail GI within the first symbol and the second symbol being different than a sequence of a previous tail GI within a previous symbol before the first symbol.

In a tenth aspect, alone or in combination with one or more of the first through ninth aspects, a length of the extra GI is longer or shorter than a length of the tail GI based at least in part on ISI protection to be used for the first symbol being more or less than the ISI protection to be used for the second symbol.

In an eleventh aspect, alone or in combination with one or more of the first through tenth aspects, a length of the extra GI is based at least in part on a switch of one or more of an MCS or a channel type between the first symbol and a previous symbol.

In a twelfth aspect, alone or in combination with one or more of the first through eleventh aspects, the configuration configures multiple extra GIs associated with a beam switch.

In a thirteenth aspect, alone or in combination with one or more of the first through twelfth aspects, the configuration indicates a first short extra GI that is added next to the tail GI within the first symbol, based at least in part on a difference between a length of the tail GI the first symbol and a length of the tail GI of the second symbol, where one or more of the first time location or the second time location is further based at least in part on the first short extra GI, and a sum of the extra GI and the tail GI within the first symbol are equivalent to the tail GI within the second symbol.

In a fourteenth aspect, alone or in combination with one or more of the first through thirteenth aspects, a length of the extra GI is associated with a TDM operation or an FDM operation with other users.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
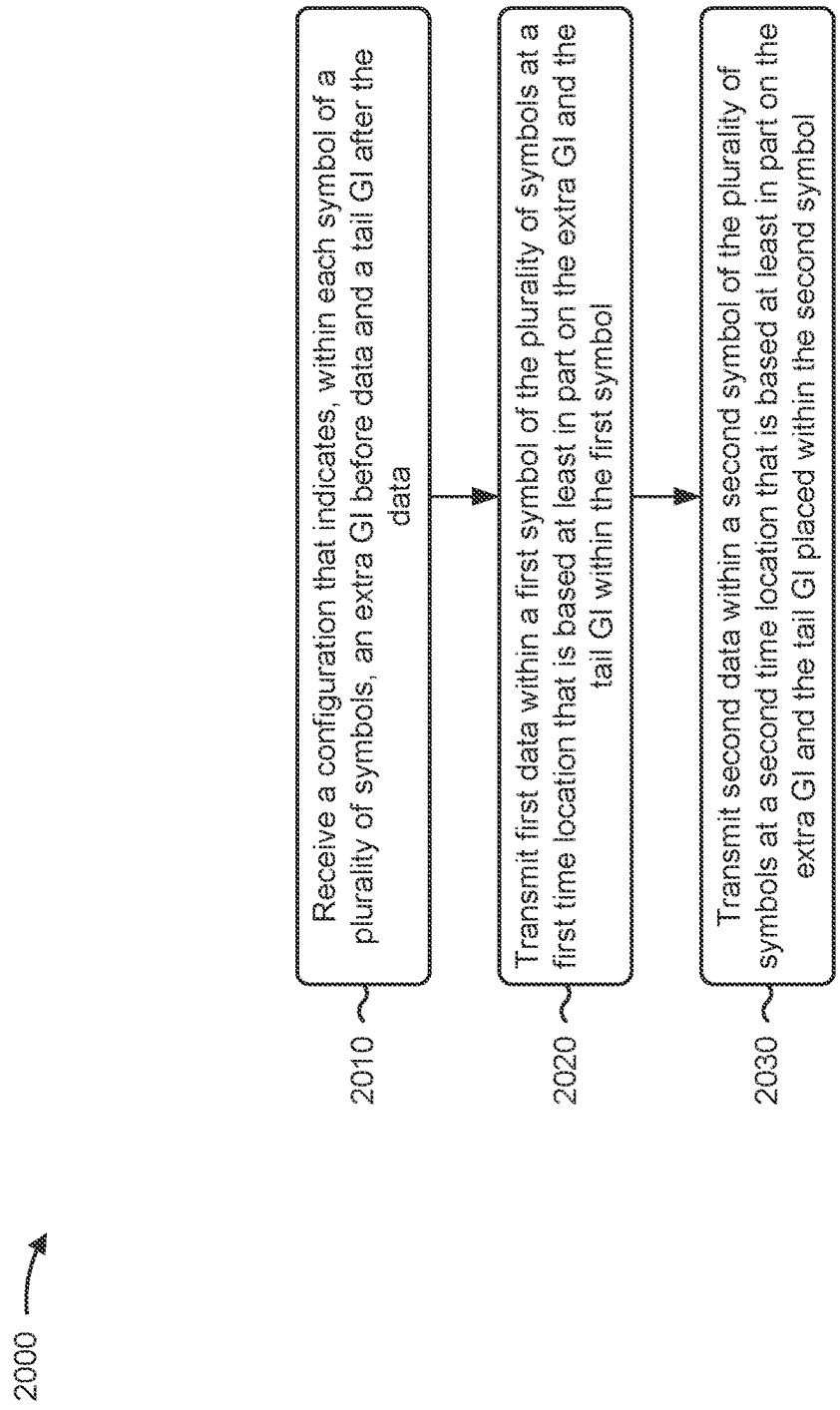
FIG. 20 is a diagram illustrating an example process performed, for example, by a UE, in accordance with the present disclosure.

FIG. 20 is a diagram illustrating an example process 2000 performed, for example, by a UE, in accordance with the present disclosure. Example process 2000 is an example where the UE (e.g., UE 120, UE 720) performs operations associated with using an extra GI.

As shown in FIG. 20, in some aspects, process 2000 may include receiving a configuration that indicates, within each symbol of a plurality of symbols, an extra GI before data and a tail GI after the data (block 2010). For example, the UE (e.g., using reception component 2202 and/or communication manager 2206, depicted in FIG. 22) may receive a configuration that indicates, within each symbol of a plurality of symbols, an extra GI before data and a tail GI after the data, as described above.

As further shown in FIG. 20, in some aspects, process 2000 may include transmitting first data within a first symbol of the plurality of symbols at a first time location that is based at least in part on the extra GI and the tail GI within the first symbol (block 2020). For example, the UE (e.g., using transmission component 2204 and/or communication manager 2206, depicted in FIG. 22) may transmit first data within a first symbol of the plurality of symbols at a first time location that is based at least in part on the extra GI and the tail GI within the first symbol, as described above.

As further shown in FIG. 20, in some aspects, process 2000 may include transmitting second data within a second symbol of the plurality of symbols at a second time location that is based at least in part on the extra GI and the tail GI placed within the second symbol (block 2030). For example, the UE (e.g., using transmission component 2204 and/or communication manager 2206, depicted in FIG. 22) may transmit second data within a second symbol of the plurality of symbols at a second time location that is based at least in part on the extra GI and the tail GI placed within the second symbol, as described above.

Process 2000 may include additional aspects, such as any single aspect or any combination of aspects described below and/or in connection with one or more other processes described elsewhere herein.

In a first aspect, the configuration indicates, within each symbol of the plurality of symbols, a head GI between the extra GI and the data in the symbol, and the first time location is further based at least in part on the head GI in the first symbol.

In a second aspect, alone or in combination with the first aspect, the configuration indicates one or more of a sequence of the extra GI or a length of the extra GI that is based at least in part on a length of the tail GI and inter-symbol interference information.

In a third aspect, alone or in combination with one or more of the first and second aspects, the first symbol is a reference signal symbol.

In a fourth aspect, alone or in combination with one or more of the first through third aspects, the configuration indicates a first location within a slot for the extra GI.

In a fifth aspect, alone or in combination with one or more of the first through fourth aspects, the configuration indicates a second location within a slot for another extra GI.

In a sixth aspect, alone or in combination with one or more of the first through fifth aspects, transmitting the first data and transmitting the second data includes transmitting the first data and transmitting the second data based at least in part on a sequence of the extra GI within the first symbol and the second symbol being different than a sequence of a previous extra GI within a previous symbol before the first symbol.

In a seventh aspect, alone or in combination with one or more of the first through sixth aspects, a length of the extra GI is longer or shorter than a length of the tail GI based at least in part on ISI protection for the first symbol being more or less than the ISI protection to be used for the second symbol.

In an eighth aspect, alone or in combination with one or more of the first through seventh aspects, a length of the extra GI is based at least in part on a switch of one or more of an MCS or a channel type between the first symbol and a previous symbol.

In a ninth aspect, alone or in combination with one or more of the first through eighth aspects, the configuration configures multiple extra GIs associated with a beam switch.

In a tenth aspect, alone or in combination with one or more of the first through ninth aspects, the configuration indicates a first short extra GI that is added next to the tail GI within the first symbol, based at least in part on a difference between a length of the tail GI the first symbol and a length of the tail GI of the second symbol, where one or more of the first time location or the second time location is further based at least in part on the first short extra GI, and a sum of the extra GI and the tail GI within the first symbol are equivalent to the tail GI within the second symbol.

In an eleventh aspect, alone or in combination with one or more of the first through tenth aspects, a length of the extra GI is associated with operating in a TDM operation or an FDM operation with other users.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
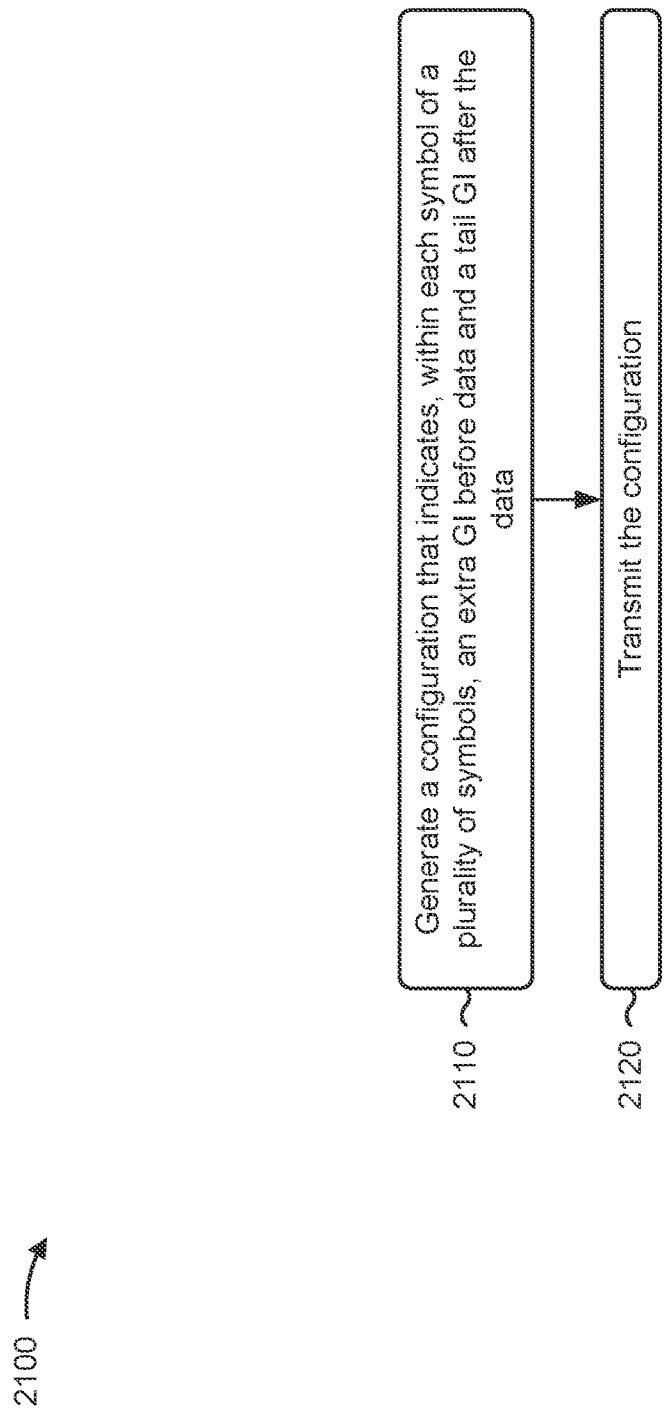
FIG. 21 is a diagram illustrating an example process performed, for example, by a network entity, in accordance with the present disclosure.

FIG. 21 is a diagram illustrating an example process 2100 performed, for example, by a network entity, in accordance with the present disclosure. Example process 2100 is an example where the network entity (e.g., network node 110, network entity 710) performs operations associated with using an extra GI.

As shown in FIG. 21, in some aspects, process 2100 may include generating a configuration that indicates, within each symbol of a plurality of symbols, an extra GI before data and a tail GI after the data (block 2110). For example, the network entity (e.g., using communication manager 2306, depicted in FIG. 23) may generate a configuration that indicates, within each symbol of a plurality of symbols, an extra GI before data and a tail GI after the data, as described above.

As further shown in FIG. 21, in some aspects, process 2100 may include transmitting the configuration (block 2120). For example, the network entity (e.g., using transmission component 2304 and/or communication manager 2306, depicted in FIG. 23) may transmit the configuration, as described above.

Process 2100 may include additional aspects, such as any single aspect or any combination of aspects described below and/or in connection with one or more other processes described elsewhere herein.

In a first aspect, process 2100 includes transmitting first data within a first symbol of the plurality of symbols at a first time location that is based at least in part on the extra GI and the tail GI within the first symbol, and transmitting second data within a second symbol of the plurality of symbols at a second time location that is based at least in part on the extra GI and the tail GI placed within the second symbol.

In a second aspect, alone or in combination with the first aspect, process 2100 includes decoding first data within a first symbol of the plurality of symbols at a first time location that is based at least in part on the extra GI and the tail GI within the first symbol, and decoding second data within a second symbol of the plurality of symbols at a second time location that is based at least in part on the tail GI within the second symbol.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
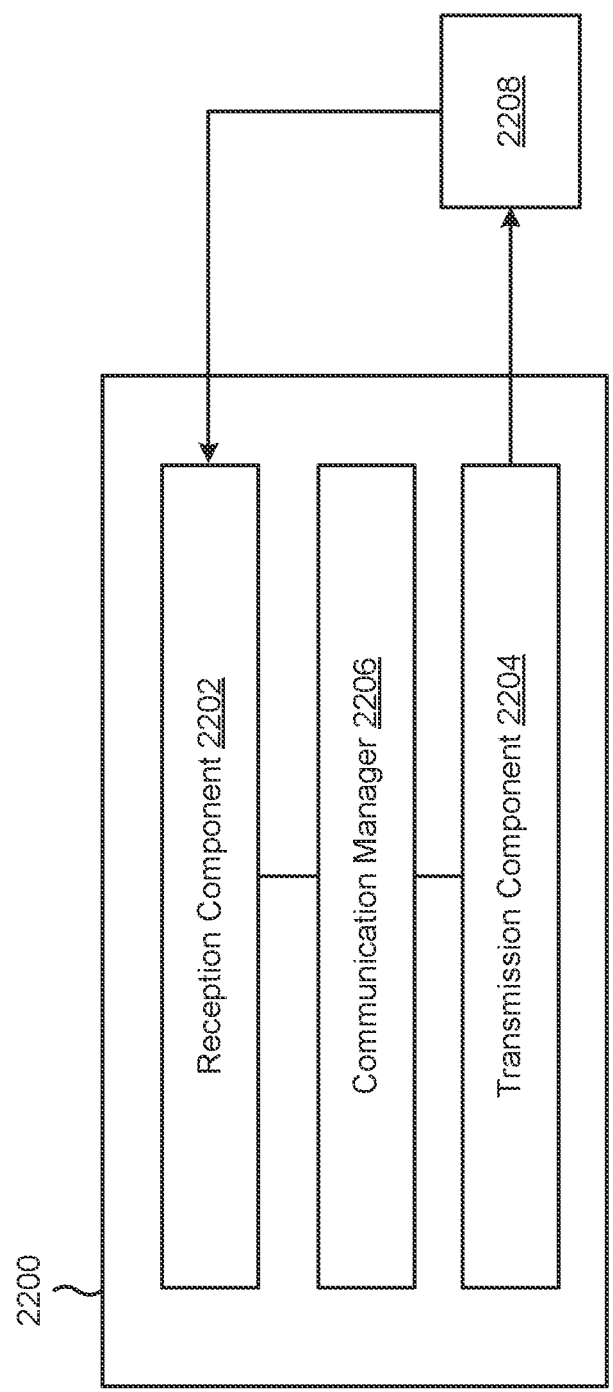
FIG. 22 is a diagram of an example apparatus for wireless communication, in accordance with the present disclosure.

FIG. 22 is a diagram of an example apparatus 2200 for wireless communication, in accordance with the present disclosure. The apparatus 2200 may be a UE, or a UE may include the apparatus 2200. In some aspects, the apparatus 2200 includes a reception component 2202, a transmission component 2204, and/or a communication manager 2206, which may be in communication with one another (for example, via one or more buses and/or one or more other components). In some aspects, the communication manager 2206 is the communication manager 140 described in connection with FIG. 1. As shown, the apparatus 2200 may communicate with another apparatus 2208, such as a UE or a network node (such as a CU, a DU, an RU, or a base station), using the reception component 2202 and the transmission component 2204.

In some aspects, the apparatus 2200 may be configured to perform one or more operations described herein in connection with FIGS. 1-18. Additionally, or alternatively, the apparatus 2200 may be configured to perform one or more processes described herein, such as process 1900 of FIG. 19, process 2000 of FIG. 20, or a combination thereof. In some aspects, the apparatus 2200 and/or one or more components shown in FIG. 22 may include one or more components of the UE described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2208. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a modem, a demodulator, a MIMO detector, a receive processor, a controller/processor, a memory, or a combination thereof, of the UE described in connection with FIG. 2.

The transmission component 2204 may transmit communications, such as reference signals, control information, data communications, or a combination thereof, to the apparatus 2208. In some aspects, one or more other components of the apparatus 2200 may generate communications and may provide the generated communications to the transmission component 2204 for transmission to the apparatus 2208. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2208. In some aspects, the transmission component 2204 may include one or more antennas, a modem, a modulator, a transmit MIMO processor, a transmit processor, a controller/processor, a memory, or a combination thereof, of the UE described in connection with FIG. 2. In some aspects, the transmission component 2204 may be co-located with the reception component 2202 in a transceiver.

The communication manager 2206 may support operations of the reception component 2202 and/or the transmission component 2204. For example, the communication manager 2206 may receive information associated with configuring reception of communications by the reception component 2202 and/or transmission of communications by the transmission component 2204. Additionally, or alternatively, the communication manager 2206 may generate and/or provide control information to the reception component 2202 and/or the transmission component 2204 to control reception and/or transmission of communications.

In some aspects, as a receiver, the reception component 2202 may receive a configuration that indicates, within each symbol of a plurality of symbols, an extra GI before data and a tail GI after the data. The communication manager 2206 may decode first data within a first symbol of the plurality of symbols at a first time location that is based at least in part on the extra GI and the tail GI within the first symbol. The communication manager 2206 may decode second data within a second symbol of the plurality of symbols at a second time location that is based at least in part on the tail GI within the second symbol.

The communication manager 2206 may shift an FFT window for decoding the first data such that the FFT window includes the first, where the FFT window is shifted includes the first data, and the FFT window that is shifted starts at an end of or within the extra GI within the first symbol.

In some aspects, as a transmitter, the reception component 2202 may receive a configuration that indicates, within each symbol of a plurality of symbols, an extra GI before data and a tail GI after the data. The transmission component 2204 may transmit first data within a first symbol of the plurality of symbols at a first time location that is based at least in part on the extra GI and the tail GI within the first symbol. The transmission component 2204 may transmit second data within a second symbol of the plurality of symbols at a second time location that is based at least in part on the extra GI and the tail GI placed within the second symbol.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

Figure 23:
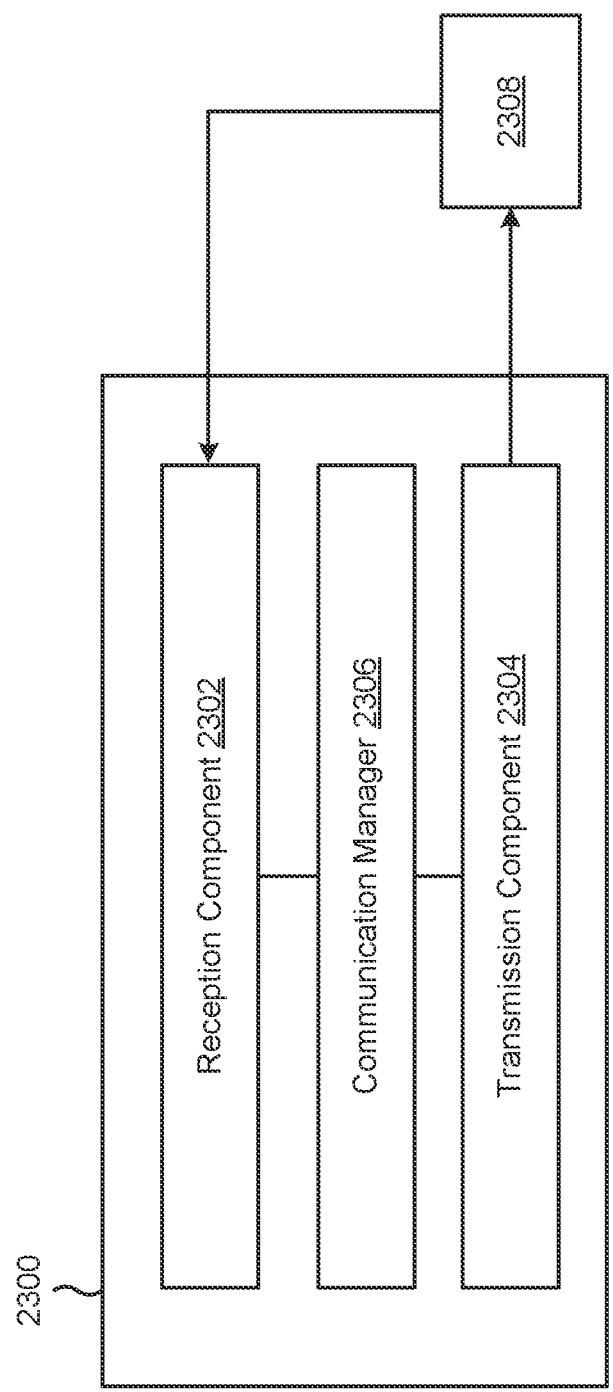
FIG. 23 is a diagram of an example apparatus for wireless communication, in accordance with the present disclosure.

FIG. 23 is a diagram of an example apparatus 2300 for wireless communication, in accordance with the present disclosure. The apparatus 2300 may be a network entity, or a network entity may include the apparatus 2300. In some aspects, the apparatus 2300 includes a reception component 2302, a transmission component 2304, and/or a communication manager 2306, which may be in communication with one another (for example, via one or more buses and/or one or more other components). In some aspects, the communication manager 2306 is the communication manager 150 described in connection with FIG. 1. As shown, the apparatus 2300 may communicate with another apparatus 2308, such as a UE or a network node (such as a CU, a DU, an RU, or a base station), using the reception component 2302 and the transmission component 2304.

In some aspects, the apparatus 2300 may be configured to perform one or more operations described herein in connection with FIGS. 1-18. Additionally, or alternatively, the apparatus 2300 may be configured to perform one or more processes described herein, such as process 2100 of FIG. 21. In some aspects, the apparatus 2300 and/or one or more components shown in FIG. 23 may include one or more components of the network entity described in connection with FIG. 2. Additionally, or alternatively, one or more components shown in FIG. 23 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2302 may receive communications, such as reference signals, control information, data communications, or a combination thereof, from the apparatus 2308. The reception component 2302 may provide received communications to one or more other components of the apparatus 2300. In some aspects, the reception component 2302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2300. In some aspects, the reception component 2302 may include one or more antennas, a modem, a demodulator, a MIMO detector, a receive processor, a controller/processor, a memory, or a combination thereof, of the network entity described in connection with FIG. 2.

The transmission component 2304 may transmit communications, such as reference signals, control information, data communications, or a combination thereof, to the apparatus 2308. In some aspects, one or more other components of the apparatus 2300 may generate communications and may provide the generated communications to the transmission component 2304 for transmission to the apparatus 2308. In some aspects, the transmission component 2304 may perform signal processing on the generated communications (such as filtering, amplification, modulation, digital-to-analog conversion, multiplexing, interleaving, mapping, or encoding, among other examples), and may transmit the processed signals to the apparatus 2308. In some aspects, the transmission component 2304 may include one or more antennas, a modem, a modulator, a transmit MIMO processor, a transmit processor, a controller/processor, a memory, or a combination thereof, of the network entity described in connection with FIG. 2. In some aspects, the transmission component 2304 may be co-located with the reception component 2302 in a transceiver.

The communication manager 2306 may support operations of the reception component 2302 and/or the transmission component 2304. For example, the communication manager 2306 may receive information associated with configuring reception of communications by the reception component 2302 and/or transmission of communications by the transmission component 2304. Additionally, or alternatively, the communication manager 2306 may generate and/or provide control information to the reception component 2302 and/or the transmission component 2304 to control reception and/or transmission of communications.

The communication manager 2306 may generate a configuration that indicates, within each symbol of a plurality of symbols, an extra GI before data and a tail GI after the data. The transmission component 2304 may transmit the configuration.

The transmission component 2304 may transmit first data within a first symbol of the plurality of symbols at a first time location that is based at least in part on the extra GI and the tail GI within the first symbol. The transmission component 2304 may transmit second data within a second symbol of the plurality of symbols at a second time location that is based at least in part on the extra GI and the tail GI placed within the second symbol.

The communication manager 2306 may decode first data within a first symbol of the plurality of symbols at a first time location that is based at least in part on the extra GI and the tail GI within the first symbol. The communication manager 2306 may decode second data within a second symbol of the plurality of symbols at a second time location that is based at least in part on the tail GI within the second symbol.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of (one or more) components shown in FIG. 23 may perform one or more functions described as being performed by another set of components shown in FIG. 23.

The following provides an overview of some Aspects of the present disclosure:

Aspect 1: A method of wireless communication performed by a user equipment (UE), comprising: receiving a configuration that indicates, within each symbol of a plurality of symbols, an extra guard interval (GI) before data and a tail GI after the data; decoding first data within a first symbol of the plurality of symbols at a first time location that is based at least in part on the extra GI and the tail GI within the first symbol; and decoding second data within a second symbol of the plurality of symbols at a second time location that is based at least in part on the tail GI within the second symbol.

Aspect 2: The method of Aspect 1, further comprising shifting a fast Fourier transform (FFT) window for decoding the first data, wherein the FFT window that is shifted includes the first data, and wherein the FFT window that is shifted starts at an end of or within the extra GI within the first symbol.

Aspect 3: The method of any of Aspects 1-2, wherein the configuration indicates, within each symbol of the plurality of symbols, a head GI between the extra GI and the data in the symbol, and wherein the first time location is further based at least in part on the head GI in the first symbol.

Aspect 4: The method of any of Aspects 1-3, wherein the configuration indicates one or more of a sequence of the extra GI or a length of the extra GI that is based at least in part on a length of the tail GI and inter-symbol interference information.

Aspect 5: The method of any of Aspects 1-4, wherein the first symbol is a reference signal symbol, and wherein the second symbol is a physical channel symbol.

Aspect 6: The method of any of Aspects 1-4, wherein the first symbol is a first physical channel symbol, wherein the second symbol is a second physical channel symbol, and wherein the second time location is further based at least in part on the extra GI within the second symbol.

Aspect 7: The method of any of Aspects 1-6, wherein the configuration indicates a first location within a slot for the extra GI.

Aspect 8: The method of Aspect 7, wherein the configuration indicates a second location within the slot for another extra GI.

Aspect 9: The method of any of Aspects 1-8, wherein the first time location is further based at least in part on one or more of a dedicated suppression sample located at an edge of a data tone, shifting a fast Fourier transform (FFT) window for the first data away from an edge of the first data, or an application of one or more weighted overlap and add portions placed within the first symbol.

Aspect 10: The method of any of Aspects 1-9, wherein decoding the first data and decoding the second data includes decoding the first data and decoding the second data based at least in part on a sequence of the tail GI within the first symbol and the second symbol being different than a sequence of a previous tail GI within a previous symbol before the first symbol.

Aspect 11: The method of any of Aspects 1-10, wherein a length of the extra GI is longer or shorter than a length of the tail GI based at least in part on inter-symbol interference (ISI) protection to be used for the first symbol being more or less than the ISI protection to be used for the second symbol.

Aspect 12: The method of any of Aspects 1-11, wherein a length of the extra GI is based at least in part on a switch of one or more of a modulation and coding scheme or a channel type between the first symbol and a previous symbol.

Aspect 13: The method of any of Aspects 1-12, wherein the configuration configures multiple extra GIs associated with a beam switch.

Aspect 14: The method of any of Aspects 1-13, wherein the configuration indicates a first short extra GI that is added next to the tail GI within the first symbol, based at least in part on a difference between a length of the tail GI the first symbol and a length of the tail GI of the second symbol, wherein one or more of the first time location or the second time location is further based at least in part on the first short extra GI, and wherein a sum of the extra GI and the tail GI within the first symbol are equivalent to the tail GI within the second symbol.

Aspect 15: The method of any of Aspects 1-14, wherein a length of the extra GI is associated with a time division multiplexing operation or a frequency division multiplexing operation with other users.

Aspect 16: A method of wireless communication performed by a user equipment (UE), comprising: receiving a configuration that indicates, within each symbol of a plurality of symbols, an extra guard interval (GI) before data and a tail GI after the data; transmitting first data within a first symbol of the plurality of symbols at a first time location that is based at least in part on the extra GI and the tail GI within the first symbol; and transmitting second data within a second symbol of the plurality of symbols at a second time location that is based at least in part on the extra GI and the tail GI placed within the second symbol.

Aspect 17: The method of Aspect 16, wherein the configuration indicates, within each symbol of the plurality of symbols, a head GI between the extra GI and the data in the symbol, and wherein the first time location is further based at least in part on the head GI in the first symbol.

Aspect 18: The method of any of Aspects 16-17, wherein the configuration indicates one or more of a sequence of the extra GI or a length of the extra GI that is based at least in part on a length of the tail GI and inter-symbol interference information.

Aspect 19: The method of any of Aspects 16-18, wherein the first symbol is a reference signal symbol.

Aspect 20: The method of any of Aspects 16-19, wherein the configuration indicates a first location within a slot for the extra GI.

Aspect 21: The method of Aspect 20, wherein the configuration indicates a second location within a slot for another extra GI.

Aspect 22: The method of any of Aspects 16-21, wherein transmitting the first data and transmitting the second data includes transmitting the first data and transmitting the second data based at least in part on a sequence of the extra GI within the first symbol and the second symbol being different than a sequence of a previous extra GI within a previous symbol before the first symbol.

Aspect 23: The method of any of Aspects 16-22, wherein a length of the extra GI is longer or shorter than a length of the tail GI based at least in part on inter-symbol interference (ISI) protection to be used for the first symbol being more or less than the ISI protection to be used for the second symbol.

Aspect 24: The method of any of Aspects 16-23, wherein a length of the extra GI is based at least in part on a switch of one or more of a modulation and coding scheme or a channel type between the first symbol and a previous symbol.

Aspect 25: The method of any of Aspects 16-24, wherein the configuration configures multiple extra GIs associated with a beam switch.

Aspect 26: The method of any of Aspects 16-25, wherein the configuration indicates a first short extra GI that is added next to the tail GI within the first symbol, based at least in part on a difference between a length of the tail GI the first symbol and a length of the tail GI of the second symbol, wherein one or more of the first time location or the second time location is further based at least in part on the first short extra GI, and wherein a sum of the extra GI and the tail GI within the first symbol are equivalent to the tail GI within the second symbol.

Aspect 27: The method of any of Aspects 16-26, wherein a length of the extra GI is associated with operating in a time division multiplexing operation or a frequency division multiplexing operation with other users.

Aspect 28: A method of wireless communication performed by a network entity, comprising: generating a configuration that indicates, within each symbol of a plurality of symbols, an extra guard interval (GI) before data and a tail GI after the data; and transmitting the configuration.

Aspect 29: The method of Aspect 28, further comprising: transmitting first data within a first symbol of the plurality of symbols at a first time location that is based at least in part on the extra GI and the tail GI within the first symbol; and transmitting second data within a second symbol of the plurality of symbols at a second time location that is based at least in part on the extra GI and the tail GI placed within the second symbol.

Aspect 30: The method of any of Aspects 28-29, further comprising: decoding first data within a first symbol of the plurality of symbols at a first time location that is based at least in part on the extra GI and the tail GI within the first symbol; and decoding second data within a second symbol of the plurality of symbols at a second time location that is based at least in part on the tail GI within the second symbol.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a configuration that indicates, within each symbol of a plurality of symbols, an extra guard interval (GI) before data and a tail GI after the data;
decode first data within a first symbol of the plurality of symbols at a first time location that is based at least in part on the extra GI and the tail GI within the first symbol; and
decode second data within a second symbol of the plurality of symbols at a second time location that is based at least in part on the tail GI within the second symbol.

2. The UE of claim 1, wherein the one or more processors are configured to shift a fast Fourier transform (FFT) window for decoding the first data, wherein the FFT window that is shifted includes the first data, and wherein the FFT window that is shifted starts at an end of or within the extra GI within the first symbol.

3. The UE of claim 1, wherein the configuration indicates, within each symbol of the plurality of symbols, a head GI between the extra GI and the data in the symbol, and wherein the first time location is further based at least in part on the head GI in the first symbol.

4. The UE of claim 1, wherein the configuration indicates one or more of a sequence of the extra GI or a length of the extra GI that is based at least in part on a length of the tail GI and inter-symbol interference information.

5. The UE of claim 1, wherein the first symbol is a reference signal symbol, and wherein the second symbol is a physical channel symbol.

6. The UE of claim 1, wherein the first symbol is a first physical channel symbol, wherein the second symbol is a second physical channel symbol, and wherein the second time location is further based at least in part on the extra GI within the second symbol.

7. The UE of claim 1, wherein the configuration indicates a first location within a slot for the extra GI.

8. The UE of claim 7, wherein the configuration indicates a second location within the slot for another extra GI.

9. The UE of claim 1, wherein the first time location is further based at least in part on one or more of a dedicated suppression sample located at an edge of a data tone, shifting a fast fourier transform (FFT) window for the first data away from an edge of the first data, or an application of one or more weighted overlap and add portions placed within the first symbol.

10. The UE of claim 1, wherein the one or more processors, to decode the first data and decode the second data, are configured to decode the first data and decode the second data based at least in part on a sequence of the tail GI within the first symbol and the second symbol being different than a sequence of a previous tail GI within a previous symbol before the first symbol.

11. The UE of claim 1, wherein a length of the extra GI is longer or shorter than a length of the tail GI based at least in part on inter-symbol interference (ISI) protection to be used for the first symbol being more or less than the ISI protection to be used for the second symbol.

12. The UE of claim 1, wherein a length of the extra GI is based at least in part on a switch of one or more of a modulation and coding scheme or a channel type between the first symbol and a previous symbol.

13. The UE of claim 1, wherein the configuration configures multiple extra GIs associated with a beam switch.

14. The UE of claim 1, wherein the configuration indicates a first short extra GI that is added next to the tail GI within the first symbol, based at least in part on a difference between a length of the tail GI the first symbol and a length of the tail GI of the second symbol, wherein one or more of the first time location or the second time location is further based at least in part on the first short extra GI, and wherein a sum of the extra GI and the tail GI within the first symbol are equivalent to the tail GI within the second symbol.

15. The UE of claim 1, wherein a length of the extra GI is associated with a time division multiplexing operation or a frequency division multiplexing operation with other users.

16. A user equipment (UE) for wireless communication, comprising:
one or more memories; and
one or more processors, coupled to the one or more memories, configured to:
receive a configuration that indicates, within each symbol of a plurality of symbols, an extra guard interval (GI) before data and a tail GI after the data;
transmit first data within a first symbol of the plurality of symbols at a first time location that is based at least in part on the extra GI and the tail GI within the first symbol; and
transmit second data within a second symbol of the plurality of symbols at a second time location that is based at least in part on the extra GI and the tail GI placed within the second symbol.

17. The UE of claim 16, wherein the configuration indicates, within each symbol of the plurality of symbols, a head GI between the extra GI and the data in the symbol, and wherein the first time location is further based at least in part on the head GI in the first symbol.

18. The UE of claim 16, wherein the configuration indicates one or more of a sequence of the extra GI or a length of the extra GI that is based at least in part on a length of the tail GI and inter-symbol interference information.

19. The UE of claim 16, wherein the first symbol is a reference signal symbol.

20. The UE of claim 16, wherein the configuration indicates a first location within a slot for the extra GI.

21. The UE of claim 20, wherein the configuration indicates a second location within a slot for another extra GI.

22. The UE of claim 16, wherein the one or more processors, to transmit the first data and transmitting the second data, are configured to transmit the first data and transmitting the second data based at least in part on a sequence of the extra GI within the first symbol and the second symbol being different than a sequence of a previous extra GI within a previous symbol before the first symbol.

23. The UE of claim 16, wherein a length of the extra GI is longer or shorter than a length of the tail GI based at least in part on inter-symbol interference (ISI) protection to be used for the first symbol being more or less than the ISI protection to be used for the second symbol.

24. The UE of claim 16, wherein a length of the extra GI is based at least in part on a switch of one or more of a modulation and coding scheme or a channel type between the first symbol and a previous symbol.

25. The UE of claim 16, wherein the configuration configures multiple extra GIs associated with a beam switch.

26. The UE of claim 16, wherein the configuration indicates a first short extra GI that is added next to the tail GI within the first symbol, based at least in part on a difference between a length of the tail GI the first symbol and a length of the tail GI of the second symbol, wherein one or more of the first time location or the second time location is further based at least in part on the first short extra GI, and wherein a sum of the extra GI and the tail GI within the first symbol are equivalent to the tail GI within the second symbol.

27. The UE of claim 16, wherein a length of the extra GI is associated with operating in a time division multiplexing operation or a frequency division multiplexing operation with other users.

28. A network entity for wireless communication, comprising:
one or more memories; and
one or more processors, coupled to the one or more memories, configured to:
generate a configuration that indicates, within each symbol of a plurality of symbols, an extra guard interval (GI) before data and a tail GI after the data;
transmit the configuration; and
based at least in part on the transmitted configuration, at least one of:
transmit first data within a first symbol of the plurality of symbols at a first time location that is based at least in part on the extra GI and the tail GI within the first symbol, and transmit second data within a second symbol of the plurality of symbols at a second time location that is based at least in part on the extra GI and the tail GI placed within the second symbol; or
decode first data within a first symbol of the plurality of symbols at a first time location that is based at least in part on the extra GI and the tail GI within the first symbol, and decode second data within a second symbol of the plurality of symbols at a second time location that is based at least in part on the tail GI within the second symbol.

29. The network entity of claim 28, wherein the one or more processors are configured to shift a fast Fourier transform (FFT) window including the first data and starting at an end of or within the extra GI within the first symbol.

30. The network entity of claim 28, wherein the configuration indicates one or more of: a sequence of the extra GI, or a length of the extra GI.

* * * * *